(12) United States Patent
Liu

(10) Patent No.: US 9,690,324 B2
(45) Date of Patent: Jun. 27, 2017

(54) ELECTRONIC DEVICE AND A SWITCHING METHOD

(71) Applicant: Lenovo (Beijing) Co., Ltd., Beijing (CN)

(72) Inventor: Junfeng Liu, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/585,806

(22) Filed: Dec. 30, 2014

(65) Prior Publication Data

US 2015/0331445 A1 Nov. 19, 2015

(30) Foreign Application Priority Data

May 19, 2014 (CN) .......................... 2014 1 0211309
May 19, 2014 (CN) .......................... 2014 1 0211394

(51) Int. Cl.
*G06F 1/16* (2006.01)
*G06F 1/20* (2006.01)

(52) U.S. Cl.
CPC .............. *G06F 1/162* (2013.01); *G06F 1/203* (2013.01)

(58) Field of Classification Search
CPC ........ H04N 5/66; G06K 9/0028; G06F 1/162; G06F 1/203
USPC .................................................... 361/679.26
See application file for complete search history.

(56) References Cited

U.S. PATENT DOCUMENTS

| | | | | |
|---|---|---|---|---|
| 6,049,455 A | * | 4/2000 | Nakamura | ............... G06F 1/203 165/80.3 |
| D610,581 S | * | 2/2010 | Prokop | ........................ D14/315 |
| D656,939 S | * | 4/2012 | Prokop | ........................ D14/393 |
| 9,116,662 B1 | * | 8/2015 | Song | ..................... G06F 1/1601 |
| 2011/0043995 A1 | * | 2/2011 | Chen | ....................... G06F 1/203 361/679.55 |
| 2013/0194741 A1 | * | 8/2013 | Uchiyama | ............. G06F 1/1681 361/679.26 |
| 2013/0207946 A1 | * | 8/2013 | Kim | ..................... G09G 3/3225 345/204 |
| 2014/0004906 A1 | * | 1/2014 | Chi | .......................... H04B 1/38 455/566 |
| 2014/0111549 A1 | * | 4/2014 | Vanska | ................. G06F 1/1626 345/656 |

(Continued)

FOREIGN PATENT DOCUMENTS

KR 20110049546 A * 5/2011

OTHER PUBLICATIONS

Noh Hee Seok, Portable Terminal, May 2011, Espacenet Translate (KR20110049546A Translate), Translate Date Jul. 11, 2016.*

*Primary Examiner* — Courtney Smith
*Assistant Examiner* — Michael Matey
(74) *Attorney, Agent, or Firm* — Harness, Dickey & Pierce, P.L.C.

(57) ABSTRACT

An electronic device is disclosed. The electronic device includes a first body, a second body and a connector. The first body includes at least a first surface and a second surface opposite to the first surface, and an output unit is provided at least on the second surface. The second body includes at least a third surface and a fourth surface opposite to the third surface, and an input unit is provided at least on the third surface. The connector connects the first body to the second body. At least one surface of the first surface, the second surface, the third surface and the fourth surface is a curved surface.

21 Claims, 17 Drawing Sheets

(56) References Cited

U.S. PATENT DOCUMENTS

2014/0354791 A1* 12/2014 Lee .................... G06K 9/00228
348/77
2015/0277496 A1* 10/2015 Reeves ................. G06F 1/1641
345/1.2

* cited by examiner

ELECTRONIC DEVICE AND A SWITCHING METHOD

The present application claims the priority to Chinese Patent disclosure No. 201410211394.5, entitled as "SWITCHING METHOD AND ELECTRONIC DEVICE", filed on May 19, 2014 with State Intellectual Property Office of People's Republic of China, which is incorporated herein by reference in its entirety.

The present application claims the priority to Chinese Patent disclosure No. 201410211309.5, entitled as "ELECTRONIC DEVICE", filed on May 19, 2014 with State Intellectual Property Office of People's Republic of China, which is incorporated herein by reference in its entirety.

FIELD

The present disclosure relates to the field of electronic technology, and in particular to an electronic device and a switching method.

BACKGROUND

With the development of science and technology and the progress of society, an electronic device has been developed rapidly, and more and more kinds of electronic devices are developed. Electronic devices, such as slide phones, clamshell phones, laptop computers and plug-in laptop computers, have become an indispensable composition in people's daily life and work. People also enjoy various conveniences brought by the scientific development. Nowadays, people can enjoy the comfortable life brought by scientific development by means of various kinds of electronic devices.

An existing electronic device includes a first body, a second body and a connector for connecting the first body and the second body. The first body includes a first surface and a second surface opposite to the first surface, and a display screen is provided on the second surface. The second body includes a third surface and a fourth surface opposite to the third surface, and multiple keys are provided on the third surface. From an overall perspective, i.e., chamfers at edges of the surfaces, the grooves on surface due to set the button, a height difference between an upper surface of the key and the whole plane, the holes or slots provided on the surface, and a height difference between the display screen and the second surface are ignored, and the first surface, the second surface, the third surface and the fourth surface each is flat surfaces.

Since each of the first surface, the second surface, the third surface and the fourth surface is a flat surface as a whole, requirement of a specific scene cannot be met.

SUMMARY

It is provided an electronic device and a switch method in this disclosure.

According to one aspect of present disclosure, an electronic device is provided, which includes:
  a first body including at least a first surface and a second surface opposite to the first surface, where an output unit is provided at least on the second surface;
  a second body including at least a third surface and a fourth surface opposite to the third surface, where an input unit is provided at least on the third surface; and
  a connector configured to movably connect the first body to the second body,
  wherein at least one of the first surface, the second surface, the third surface and the fourth surface is a curved surface.

According to another aspect of present disclosure, a switching method is provided, which includes: switching an electronic device between a first mode and a second mode upon a first body of the electronic device moving relative to a second body of the electronic device, wherein a connector movably connects the first body to the second body, the first body includes at least a first surface and a second surface opposite to the first surface, the second body includes at least a third surface and a fourth surface opposite to the third surface; changing at least one of the first, second, third and fourth surfaces upon switching the electronic device between the first and the second modes, the changing includes a switching between a flat surface and a curved surface or a switching between two different curved surfaces.

BRIEF DESCRIPTION OF THE DRAWINGS

To explain the technical solution in the embodiment of the disclosure and the conventional art more clearly, drawings to be used in the description of the embodiment are described in the following. Apparently, the drawings described below are only some of the embodiments of the disclosure.

DETAILED DESCRIPTION

In the embodiment of the disclosure, an electronic device is provided, and thus the technical problem that the electronic device can not met requirement of a specific scene since the first surface, the second surface, the third surface and the fourth surface as a whole is a flat surface is solved.

An electronic device is provided in the disclosure, the electronic device includes: a first body, a second body and a connector. The first body includes at least a first surface and a second surface opposite to the first surface, where a first output unit is at least provided on the second surface.

The second body includes at least a third surface and a fourth surface opposite to the third surface, where a first input unit is at least provided on the third surface.

The connector is configured to connect the first body and the second body, and has at least a first state, where a distance between a first reference point on a first side of the second surface and a second reference point on a second side of the third surface is greater than a threshold when the connector is in the first state.

The first side is a side of the second surface which is away from the second body, the second side is a side of the third surface which is away from the first body, and a position of the first reference point on the first side corresponds to a position of the second reference point on the second side.

In a first mode of the electronic device in which the connector is the first state, at least one surface of the first surface, the second surface, the third surface and the fourth surface is a curved surface.

In the above electronic device, by providing at least one surface of the first surface, the second surface, the third surface and the fourth surface as a curved surface, the technical problem in the conventional art that the electronic device can not met requirement of a specific scene since the first surface, the second surface, the third surface and the fourth surface as a whole is a flat surface is solved.

To better understanding the above technical solution, the detailed description is given in conjunction with the drawings and the embodiments.

Figure 1:
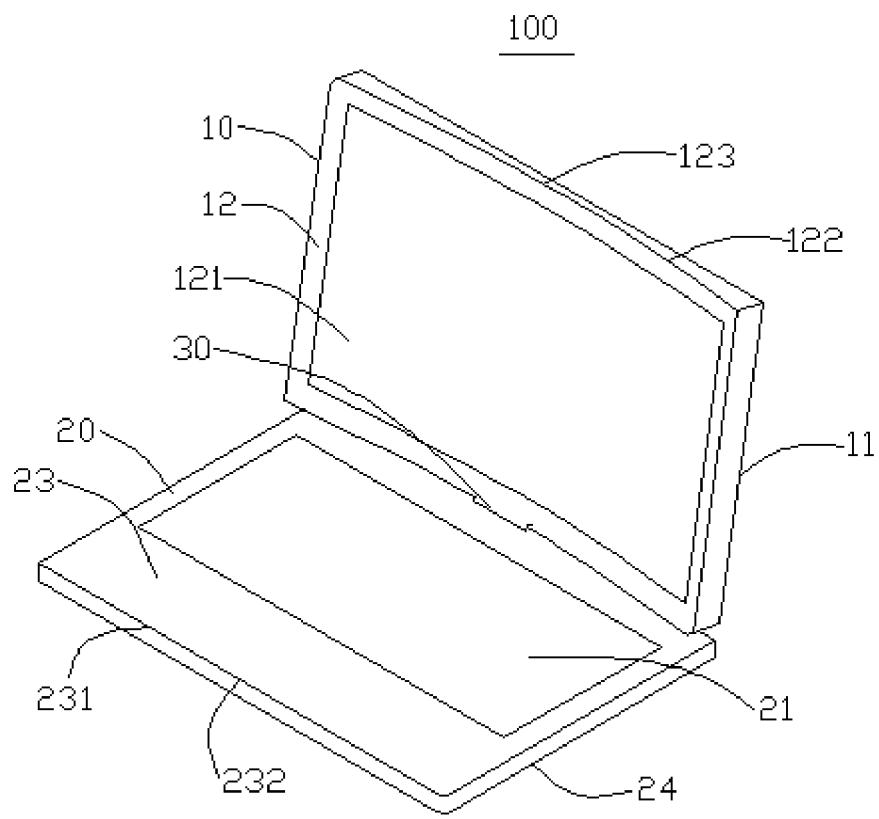
FIG. 1 is a schematic structural diagram of an electronic device according to an embodiment of the disclosure.

As shown in FIG. 1, a schematic structural diagram of an electronic device according to an embodiment of the disclosure is provided, the electronic device includes a first body 10, a second body 20 and a connector 30.

The first body 10 includes at least a first surface 11 and a second surface 12 opposite to the first surface, and a first output unit 121 is at least provided on the second surface 12. The first output unit 121 may be an image output unit (such as a display screen), an audio output unit (such as a loudspeaker) or the like. In this embodiment, the first output unit 121 is a display unit. In other embodiments, the first output unit 121 may be a loudspeaker or the like. In other embodiments, multiple same or different first output units 121 may be provided on the second surface 12. Further, a second input unit, such as an input acquisition unit (such as a key with at least one button or a touch sensing unit), an image acquisition unit (such as a camera), or an audio acquisition unit (such as a microphone) and the like, may be provided on the second surface 12. The second surface 12 has a first side 122 away from the second body 20. A first reference point 123 is provided on the first side 122.

The second body 20 includes at least a third surface 23 and a fourth surface 24 opposite to the third surface 23, and a first input unit 21 is provided on the third surface 23. The first input unit 21 may be an input acquisition unit (such as a key having at least one button or a touch sensing unit), an image acquisition unit (such as a camera), or an audio acquisition unit (such as a microphone) and the like. In this embodiment, the first input unit 21 is a keyboard. In other embodiments, the first input unit 21 may be a touch sensing unit, a camera, or a microphone or the like. In other embodiments, multiple same or different first input units 21 may be provided on the third surface 23. Further, a second output unit may be provided on the third surface 23, such as an image output unit (such as a display screen) or an audio output unit (such as a loudspeaker).

The third surface 23 has a second side 231 away from the first body. A second reference point 232 is provided on the second side 231, and the position of the second reference point 232 on the second side 231 corresponds to that of the first reference point 123 on the first side 122. In other words, a method for determining the position of the first reference point 123 on the first side 122 is the same as a method for determining the position of the second reference point 232 on the second side 231. For example, if the first reference point 123 is a left endpoint on the first side 122, the second reference point 232 is a left endpoint on the second side 231. If the first reference point 123 is a middle point on the first side 122, the second reference point 232 is a middle point on the second side 231. If the first reference point 123 is a right endpoint on the first side 122, the second reference point 232 is a right endpoint on the second side 231.

The connector 30 connects the first body 10 and the second body 20, so that the first body 10 and the second body 20 may move relative to each other by means of the connector 30. The connector 30 may be a rotary connecting mechanism, a slidable connection mechanism, a combination of the rotary connecting mechanism and the slidable connection mechanism, or a plug-in connection mechanism, which will be described in detail later. The connector 30 has at least a first state. When the connector 30 is in the first state, a distance between the first reference point 123 on the first side 122 of the second surface 12 and the second reference point 232 on the second side 231 of the third surface 23 is greater than a threshold. In an embodiment, the threshold may be set as required. For example, the threshold may be set to be 5 mm, 1 cm, 3 cm, 5 cm or any value.

When the connector 30 is in the first state, the electronic device 100 is in a first mode. The first mode may be an input/output mode, i.e., a mode in which the electronic device 100 is in operation. When the electronic device 100 is in the first mode, at least one surface of the first surface 11, the second surface 12, the third surface 23 and the fourth surface 24 is a curved surface. That is to say, among the first surface 11, the second surface 12, the third surface 23 and the fourth surface 24, there may be one curved surface, two curved surfaces, three curved surfaces or four curved surfaces. In this embodiment, the second surface 12 is a curved surface.

The curved surface is not a curved surface in the absolute sense, but is a curved surface as a whole. For example, a surface height difference between a frame and a display screen on the second surface is ignored, and the frame and the display screen are considered as in the same plane; holes or grooves on each surface are ignored; a height difference between a key and the whole surface is ignored; and the like. Further, if a single device, such as the display screen, on the surface has a curved surface and the area of the single device is beyond 40% of the total area of the surface, it may be considered that the surface is a curved surface as a whole. If multiple devices, such as keys of a keyboard, on the surface have curved surfaces and the area of surfaces of the multiple devices is beyond 40% of the total area of the surface, it may be considered that the surface is a curved surface as a whole. The integral shape of the surface may be set as required. The surface may be of any shape, for example a regularly-curved shape, such as an S-shape, a partial-spherical shape or a partial-cylindrical shape.

In the above electronic device 100, by providing at least one surface of the first surface 11, the second surface 12, the third surface 23 and the fourth surface 24 as a curved surface, the technical problem in the conventional art that the electronic device can not met requirement of a specific scene since the first surface, the second surface, the third surface and the fourth surface each are flat surfaces as a whole is solved.

Figure 2:
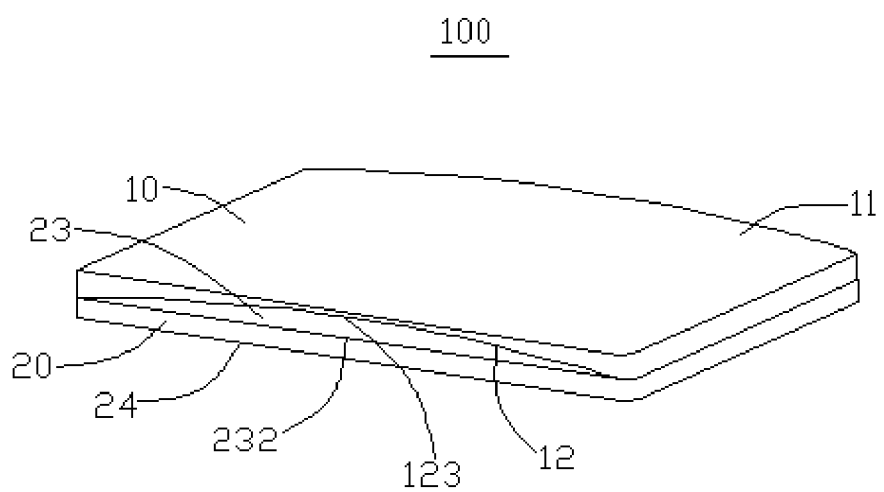
FIG. 2 is a schematic structural diagram of an electronic device in another state according to an embodiment of the disclosure.

The connector 30 may have only the first state, and accordingly, the electronic device 100 only has the first mode. Practically, the connector 30 may also have a second state. Specifically, as shown in FIG. 2, the connector 30 is in the second state different from the first state. The connector 30 may switch from the first state to the second state in a rotatable or slidable manner. The connector 30 may also have two plug-in positions. For example, when the first body 10 is plugged into a first plug-in position of the connector 30, the connector 30 is in the first state; and when the first body 10 is plugged into a second plug-in position of the connector 30, the connector 30 is in the second state. When the connector 30 is in the second state, the electronic device 100 is in the second mode different from the first mode. In the case that the first mode is the input/output mode, the second mode is a non-input/non-output mode, or another input/output mode different from the input/output mode. When the connector 30 is in the second state, a distance between the first reference point 123 and the second reference point 232 is equal to or less than the threshold.

When the connector 30 switches from the first state to the second state in the rotatable and/or slidable manner, the first body 10 may move relative to the second body 20 by means of the connector 30, to make the distance between the first reference point 123 and the second reference point 232 be equal to or less than the threshold. In the case that the connector 30 is a rotary connecting mechanism, the threshold is greater than a distance between the first side 122 of the first body 10 and the second side 231 of the second body 20 when the electronic device 100 is in the second mode. In the case that the connector 30 is a slidable connection mechanism, when the electronic device 100 is in the second mode, the threshold is equal to or greater than a square root of a sum of a square of the distance between the first reference point 123 and the second reference point 232 and a square of a result obtained by adding a distance between the first body 10 to the second body 20 to a thickness of the first body 10.

Figure 3:
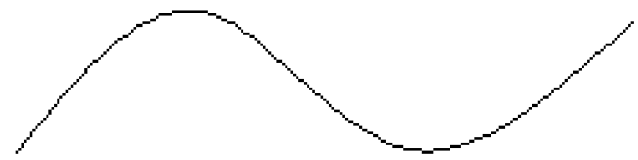
FIG. 3 is a lateral view of a curved surface of the electronic device in FIG. 1 according to an embodiment of the disclosure.

The specific shape of the curved surface is described in detail below. In an embodiment, the shape of the curved surface may be set as required. The curved surface may be of any shape, for example a regularly-curved shape. Reference is made to FIG. 3, which is a lateral view of the curved surface. The curved surface has a regularly-curved shape, and in the curved surface, shortest connection lines between any two pairs of corresponding points on two opposite sides within the curved surface have the same shape and length, that is to say, a shape and length of an intersection line between the curved surface and a second plane in parallel with a first plane in which one side in the curved surface is located are the same as that of the side respectively. Specifically, "one side in the curved surface" may be a side which corresponds to the first side 122, and may be a side which does not correspond to the first side 122.

Figure 4:
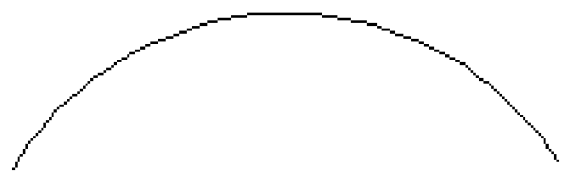
FIG. 4 is a lateral view of a curved surface of the electronic device in FIG. 1 according to another embodiment of the disclosure.

As shown in FIG. 4, the curved surface may have a partial-spherical shape or a partial-cylindrical shape, i.e., the curved surface is a curved surface on the same side of any tangent plane of the curved surface. The curved surface is on the same side of any tangent plane of the curved surface. The partial-spherical shape is an un-complete spherical shape formed by a curved surface rotating around a center point; and the partial-cylindrical shape is an un-complete cylindrical shape formed by a straight line rotating around a center point.

Further, only one set of opposite sides of the curved surface is a curved side. That is to say, the curved surface has a partial-cylindrical shape. For example, the curved side may be a side of a curved surface, of the first curved surface 11, the second curved surface 12, the third curved surface 23 and the fourth curved surface 24, corresponds to the first side 122 or the second side 231, or may be a side of a curved surface, of the first curved surface 11, the second curved surface 12, the third curved surface 23 and the fourth curved surface 24, does not correspond to the first side 122 or the second side 231. In this embodiment, the curved side is a side corresponding to the first side 122 or the second side 231, that is to say, the curved side is a longer side of the electronic device 100.

In addition, in the above embodiment, the curvature of the curved surface may be set as required, and the curved surface may be set to be a concave curved surface or a convex curved surface as required.

Further, a length of a projection of the curved side of the curved surface on a plane perpendicular to a plane in which the two straight lines are located is equal to or greater than a second threshold. The second threshold may be set as required, such as 1 cm or 3 cm. That is to say, the height of an arch of the curved surface needs to meet a certain condition.

The number of the curved surface may be set as required in the following four manners A to D.

A. The number of the curved surface is one. In the case that the number of the curved surface is one, the curved surface may be provided in the following four manners.

In a first manner, the second surface 12 is provided as a curved surface.

In the case that the second surface 12 is a curved surface, as shown in FIG. 1, the first output unit 121 is a display unit which presents a shape of a concave curved surface with respect to the first body 10, and a side on the display unit corresponding to the first side 122 is a curved side. That is to say, the first output unit 121 is an un-complete cylindrical shape formed by a straight line rotating around a center point. Since the first output unit 121 is provided as a display unit which presents a shape of a concave curved surface with respect to the first body 10, and a side on the display unit corresponding to the first side 122 is provided as a curved side, a difference between distances between points on the display unit and corresponding points on the eyeball of the viewer may be reduced, and the radian of the surface is adjusted for ensuring that distances between points on the display unit and the eye are the same, so that the user has a better sensory experience, especially for the device having the display unit with a size greater than 7 inches.

In a second manner, the third surface 23 is provided as a curved surface.

Figure 5:
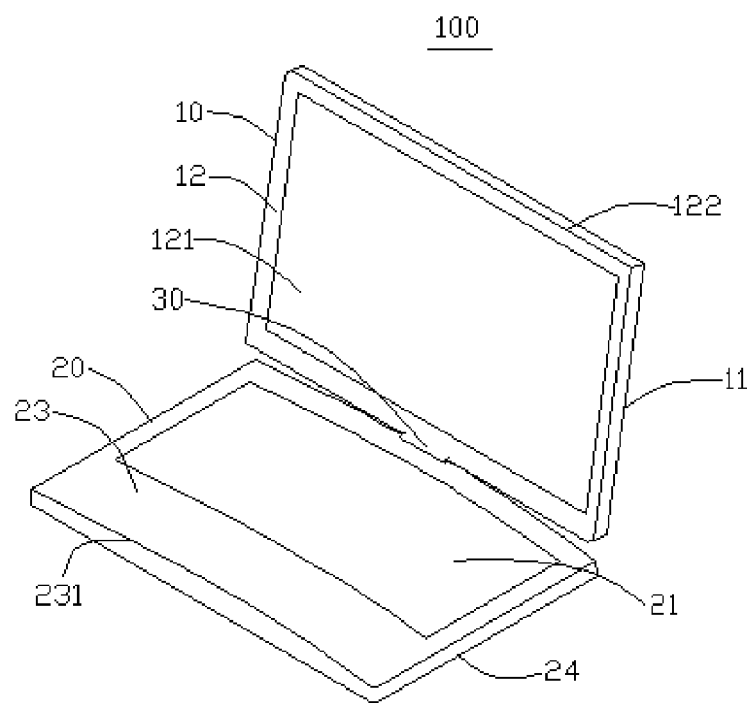
FIG. 5 is a schematic structural diagram of an electronic device according to an embodiment of the disclosure.

Reference is made to FIG. 5, which is a schematic structural diagram of an electronic device according to an embodiment of the disclosure. In this embodiment, the third surface 23 is a curved surface, and the first input unit 21 may be a contact input unit such as a touch sensing unit and/or a keyboard. In the case that the first input unit 21 is a touch panel, the first input unit 21 is a contact input unit which presents a shape of a convex curved surface with respect to the second body 20. In the case that the first input unit 21 is a keyboard, the first input unit 21 is a contact input unit which is provided along a convex curved surface, and a side of the contact input unit corresponding to the second side 231 is a curved side. That is to say, the first input unit 21 is an un-complete cylindrical shape formed by a straight line rotating around a center point. Since the first input unit 21 is provided as a contact input unit which presents a shape of a convex curved surface with respect to the second body 20 or is provided along a convex curved surface, and a side of the contact input unit corresponding to the second side 231 is a curved side, the first input unit 21 is more ergonomic curve design, and more comfortable to use, especially for the case in which the first input unit 21 is in the input mode for a long time (physically or virtually).

In a third manner, the fourth surface 24 is provided as a curved surface.

Figure 6:
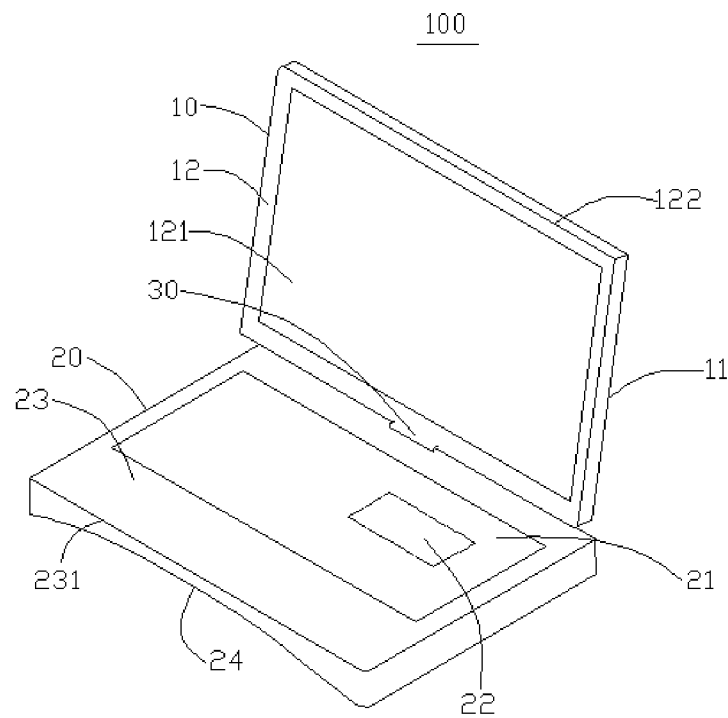
FIG. 6 is a schematic structural diagram of an electronic device according to an embodiment of the disclosure.

Reference is made to FIG. 6, which is a schematic structural diagram of an electronic device according to an embodiment of the disclosure. In this embodiment, the fourth surface 24 is a curved surface which is concave with respect to the second body 20, an outlet is provided on the fourth surface 24, a heat dissipating device 22 is provided inside the second body 20, and the hot airflow from the second body 20 may be dissipated from the outlet. An airflow path is formed for dissipating heat when the heat dissipating device operates, the outlet is located on a tail end of the airflow path, and the hot airflow may be dissipated from the outlet.

In the conventional art, since the fourth surface is a flat surface and often contacts with a supporting surface, no outlet is provided on the fourth surface. In this embodiment, since the fourth surface 24 is a curved surface, a space is left between the fourth surface 24 and a supporting surface when the fourth surface 24 is provided on the supporting surface, an outlet may be provided on the fourth surface 24, through which the hot air from the second body 20 may be dissipated for achieving the heat dissipating of the electronic device. And in the conventional, even if a foot pad is provided on the fourth surface 24, a common problem that the outlet on the flexible supporting surface, e.g. the bed, is blocked, and the problem can be solved in this disclosure.

The side of the fourth surface 24 which corresponds to the second side 231 may be a curved side, or the side which does not correspond to the second side 231 may be a curved side. The fourth surface 24 is provided as a curved surface which is concave with respect to the second body 20, an outlet is provided on the fourth surface 24, a heat dissipating device 22 is provided inside the second body 20, an airflow path is formed for dissipating heat when the heat dissipating device operates, and the outlet is located on a tail end of the airflow path, and the hot airflow can flow through the outlet for achieving heat dissipating of the electronic device, so that a better heat dissipating effect of the electronic device is obtained, and thus the performance of the electronic device is improved or the upper limit of the performance of the electronic device is improved. Further, when the electronic device 100 is in the non-input/non-output state and is carried, the electronic device 100 is closer to the user since the fourth surface 23 is a curved surface. No matter in a hand-held mode, a laptop mode, or a mode behind one's back, the electronic device can fit the curve of the body better, especially for the device with a larger screen, for facilitating carrying and reducing the collision with an external circumstance.

In a fourth manner, the first surface 11 is provided as a curved surface.

The shape of the first surface 11 may be set as a shape as required, for improving the appearance of the electronic device. Further, since the first surface 11 is a curved surface, the first surface 11 may act as a buffer when the electronic device 100 is dropped, for reducing the probability that the electronic device 100 is broken and protecting the electronic device 100. Further, the appearance of the electronic device 100 may be designed more specially, for increasing the difference between the electronic device 100 and other products and improving the recognition of the electronic device 100.

B. The number of the curved surface is two. In the case that the number of the curved surfaces is at least two, the at least two curved surfaces having matching or coincident shapes. The two curved surfaces having matching shapes here means that the shapes of the two curved surfaces are substantially the same and one of the two curved surfaces is a convex curved surface and the other is a concave curved surface. And the two curved surfaces having coincident shapes means that the shapes of the two curved surfaces are substantially the same and both of the two curved surfaces are convex curved surfaces or concave curved surfaces.

The shapes of the two curved surfaces being substantially the same does not mean that the shapes of the two curved surfaces are the same in the absolute sense, but seems to be the same substantially. For example, a surface height difference between a frame and a display screen on the second surface is ignored, and the frame and the display screen are seemed as in the same plane; holes or grooves on the surfaces are ignored; a height difference between keys and the whole surface is ignored; and the like.

In the case that the number of the curved surfaces is two, the curved surfaces may be provided at least in the following four manners.

In a first manner, the second surface 12 and the third surface 23 are curved surfaces.

If the second surface 12 and the third surface 23 each are curved surfaces, the second surface 12 may match or may not match the third surface 23 as required.

Figure 7:
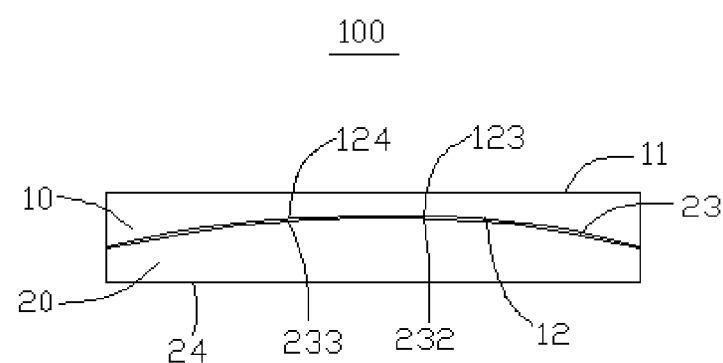
FIG. 7 is a schematic structural diagram of an electronic device according to an embodiment of the disclosure.

As shown in FIG. 7, the second surface 12 and the third surface 23 are curved surfaces having matching shapes, and in the case that the connector 30 is in the second state, a distance between a third reference point 124 in the second surface 12 and a fourth reference point 233 in the third surface 23 corresponding to the third reference point 124 is less than the thresholds, i.e., the distance between the second surface 12 and the third surface 23 is related to the distance between the first side 122 and the second side 231. In this embodiment, the second surface 12 is a concave curved surface, and the third surface 23 is a convex curved surface. In other embodiments, the second surface 12 may be provided as a convex curved surface, and the third surface 23 may be provided as a concave curved surface.

Figure 8:
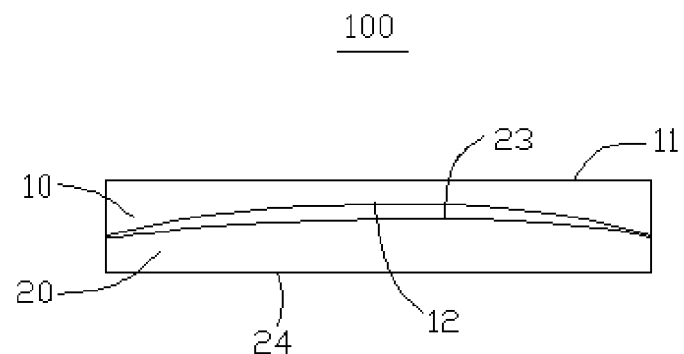
FIG. 8 is a schematic structural diagram of an electronic device according to an embodiment of the disclosure.

As shown in FIG. 8, the second surface 12 is a curved surface which is concave with respect to the first body 10, and the third surface 23 is a curved surface which is convex with respect to the second body 20. In this embodiment, the second surface 12 and the third surface 23 are curved surfaces which do not have matching shapes. In other embodiments, the second surface 12 and the third surface 23 are curved surfaces which have matching shapes.

Further, a curved surface equation of the second surface 12 is the same as that of the third surface 23. That is to say, the second surface 12 and the third surface 23 are provided as two matching curved surfaces, so that when the electronic device 100 is in the second mode, the second surface 12 and the third surface 23 can fit with each other better, so as to prevent dust, debris and the like from entering into the space between the second surface 12 and the third surface 23, and so that the devices inside the electronic device 100 can be designed and arranged more compactly.

Figure 9:
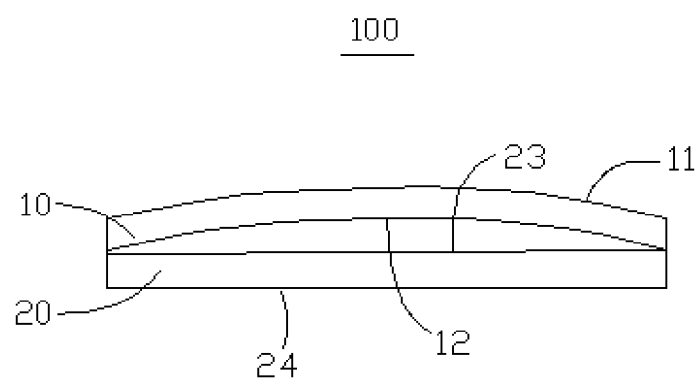
FIG. 9 is a schematic structural diagram of an electronic device according to an embodiment of the disclosure.

In a second manner, as shown in FIG. 9, the first surface 11 of the first body 10 and the second surface 12 of the second body 20 of the electronic device 100 are curved surfaces having matching shapes. In this embodiment, the third surface 23 and the fourth surface 24 are flat surfaces. Since the first surface 11 and the second surface 12 are provided as the curved surfaces having matching shapes, the appearance of the electronic device 100 may be designed more specially, for increasing the difference between the electronic device 100 and other products and improving the recognition of the electronic device 100. Further, this appearance may act as a buffer when the electronic device 100 is dropped, for reducing the probability that the electronic device 100 is broken and protecting the electronic device 100.

Figure 10:
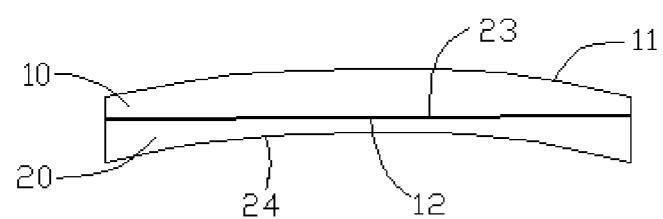
FIG. 10 is a schematic structural diagram of an electronic device according to an embodiment of the disclosure.

In a third manner, as shown in FIG. 10, the first surface 11 of the first body 10 and the fourth surface 24 of the second body 20 of the electronic device 100 are curved surfaces having matching shapes, and the second surface 12 and the third surface 23 are flat surfaces. Since the first surface 11 and the fourth surface 24 are provided as the curved surfaces having matching shapes, the appearance of the electronic device 100 may be designed more specially, for increasing the difference between the electronic device 100 and other products. Further, this appearance may act as a buffer when the electronic device 100 is dropped, for reducing the probability that the electronic device 100 is broken and protecting the electronic device 100. Further, the appearance can increase the difference between the electronic device 100 and other electronic devices, for improving the recognition of the electronic device 100. And further, when the electronic device 100 is in the non-input/non-output state and is carried, the electronic device 100 is closer to the user since the fourth surface 23 is a curved surface. No matter in a hand-held mode, a laptop mode, or a mode behind one's back, the electronic device can fit the curve of the body better, especially for the device with a larger screen, for facilitating carrying and reducing the collision with an external circumstance. An outlet is provided on the fourth surface 24, a heat dissipating device 22 is provided inside the second body 20, and the hot airflow from the second body 20 may be dissipated from the outlet. An airflow path is formed for dissipating heat when the heat dissipating device operates, the outlet is located on a tail end of the airflow path, and the hot airflow may be dissipated from the outlet.

Figure 11:
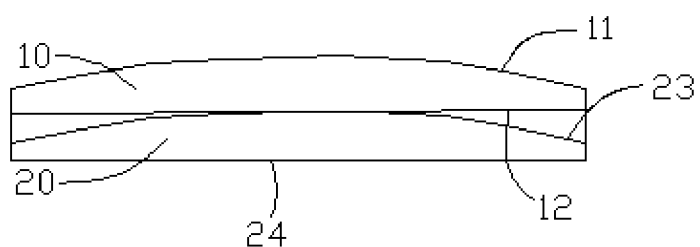
FIG. 11 is a schematic structural diagram of an electronic device according to an embodiment of the disclosure.

In a fourth manner, as shown in FIG. 11, the first surface 11 of the first body 10 and the third surface 23 of the second body 20 of the electronic device 100 are curved surfaces having coincident shapes, and the second surface 12 and the fourth surface 24 are flat surfaces. Since the first surface 11 is provided as the curved surface, the appearance of the electronic device 100 may be designed more specially, for increasing the difference between the electronic device 100 and other products and improving the recognition of the electronic device 100. Further, this appearance may act as a buffer when the electronic device 100 is dropped, for reducing the probability that the electronic device 100 is broken and protecting the electronic device 100. Further, the appearance can increase the difference between the electronic device 100 and other electronic devices. And further, since the third surface 23 on which the first input unit 21 is provided is provided as the curved surface, the first input unit 21 is more ergonomic curve design, and more comfortable to use, especially for the case in which the first input unit 21 is in the input mode for a long time (physically or virtually).

Moreover, in other embodiments, the second surface 12 of the first body 10 and the fourth surface 24 of the second body 20 of the electronic device 100 may be provided as curved surfaces having coincident shapes, and the first surface 11 and the third surface 23 may be provided as flat surfaces. Alternatively, the third surface 23 and the fourth surface 24 of the second body 20 of the electronic device 100 may be provided as curved surfaces having matching shapes, and the first surface 11 and the second surface 12 of the first body 10 may be provided as flat surfaces.

C. The number of the curved surfaces is three. In the case that the number of the curved surface is three, the curved surface may be provided in the following three manners.

In a first manner, the first surface 11, the second surface 12 and the third surface 23 are provided as curved surfaces, and the fourth surface 24 is provided as a flat surface. For example, the first surface 11 and the third surface 23 are provided as convex surfaces having coincident shapes, and the second surface 12 and the third surface 23 are provided as curved surfaces having matching shapes.

Since the first surface 11 is provided as a curved surface, the appearance of the electronic device 100 may be designed more specially, for increasing the difference between the electronic device 100 and other products and improving the recognition of the electronic device 100. Further, the appearance may act as a buffer when the electronic device 100 is dropped, for reducing the probability that the electronic device 100 is broken and protecting the electronic device 100. Further, since the third surface 23 on which the first input unit 21 is provided is provided as the curved surface, the first input unit 21 is more ergonomic curve design, and more comfortable to use, especially for the case in which the first input unit 21 is in the input mode for a long time (physically or virtually). Since the second surface 12 and the third surface 23 are provided as curved surfaces, the compactness of the fitting between the first body 10 and the second body 20 can be enhanced when the electronic device 100 is in the non-input/non-output state.

In a second manner, the first surface 11, the second surface 12 and the fourth surface 24 are provided as curved surfaces, and the third surface 23 is provided as a flat surface. For example, the first surface 11 and the second surface 12 are provided as curved surfaces having coincident shapes, and the fourth surface 24 and the first surface 11 are provided as curved surfaces having matching shapes.

Since the first surface 11 and the fourth surface 24 are provided as curved surfaces, the appearance of the electronic device 100 may be designed more specially, for increasing the difference between the electronic device 100 and other products and improving the recognition of the electronic device 100. Further, the appearance may act as a buffer when the electronic device 100 is dropped, for reducing the probability that the electronic device 100 is broken and protecting the electronic device 100. Further, since the second surface 12 on which the first output unit 121 is provided is provided as the curved surface, a difference between distances between the points on the first output unit 121 and the corresponding point on the eyeball of the viewer may be reduced, and the radian of the surface is adjusted for ensuring that the distances between the points on the first output unit 121 and the eye are the same, so that the user has a better sensory experience, especially for the device having the display unit with a size greater than 7 inches.

In a third manner, the second surface 12, the third surface 23 and the fourth surface 24 are provided as curved surfaces, and the first surface 11 is provided as a flat surface. For example, the second surface 12 and the fourth surface 24 are provided as concave surfaces having coincident shapes, and the third surface 23 and the second surface 12 are provided as curved surfaces having matching shapes.

Since the second surface 12 and the third surface 23 are provided as curved surfaces, the compactness of the fitting between the first body 10 and the second body 20 can be enhanced when the electronic device 100 is in the non-input/non-output state. Since the first surface 11 and the fourth surface 24 are provided as curved surfaces, the appearance of the electronic device 100 may be designed more specially, for increasing the difference between the electronic device 100 and other products and improving the recognition of the electronic device 100. Further, the appearance may act as a buffer when the electronic device 100 is dropped, for reducing the probability that the electronic device 100 is broken and protecting the electronic device 100.

D. The number of the curved surfaces is four.

Figure 12:
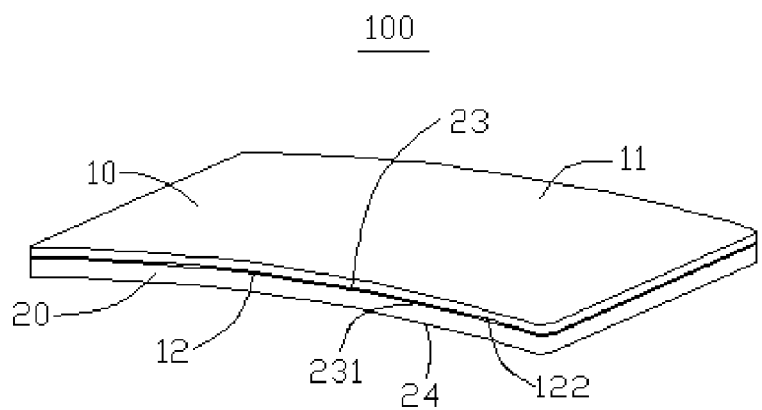
FIG. 12 is a schematic structural diagram of an electronic device according to an embodiment of the disclosure.

As shown in FIG. 12, the first surface 11, the second surface 12, the third surface 23 and the fourth surface 24 are curved surfaces having the same curved surface equations, the first surface 11 is a convex surface with respect to the first body 10, the second surface 12 is a concave surface with respect to the first body 10, the third surface 23 is a convex surface with respect to the second body 20, and the fourth surface 24 is a concave surface with respect to the second body 20.

In this embodiment, a side of the first surface 11 which corresponds to the first side 122 is a curved side, and sides of the first surface 11 which does not correspond to the first side 122 are straight lines; the first side 122 of the second surface 12 is a curved side, and sides connected to the first side 122 are straight lines; the second side 231 of the third surface 23 is a curved side, and sides connected to the second side 231 are straight sides; and a side of the fourth surface 24 which corresponds to the second side 231 is a curved side, and sides of the fourth surface 24 which do not correspond to the second side 231 are straight lines. In other embodiments, a side of the first surface 11, the second surface 12, the third surface 23 and the fourth surface 24 which corresponds to the first side 122 or the second side 231 is provided as a straight line, and sides of the first surface 11, the second surface 12, the third surface 23 and the fourth surface 24 which do not correspond to the first side 122 or the second side 231 are provided as curved sides.

When the connector 30 switches from the first state to the second state, the shape the curved surface may keep curved, or may be changed. When the electronic device 100 switches from the first mode to the second mode, the connector 30 switches from the first state to the second state, the curved surface switches to a flat surface if the number of the curved surface is one, and at least one curved surface switches to a flat surface if the number of the curved surface is two or more. Further, the switching of the surface may happen during the mode switching of the electronic device 100, or before or after the mode switching of the electronic device 100.

The controlling the curved surface to switch to the flat surface may be implemented at least in the following manners A or B.

A. a mechanical manner, in which the switching of a surface between a curved surface and a flat surface is triggered by a motion of the first body 10 relative to the second body 20, and alternatively, after the motion of the first body 10 relative to the second body 20 is completed, the surface is controlled to switch between the curved surface and the flat surface.

Figure 13:
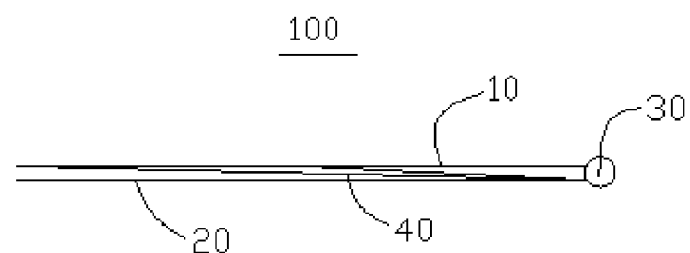
FIG. 13 is a schematic structural diagram of an electronic device according to an embodiment of the disclosure.
Figure 14:
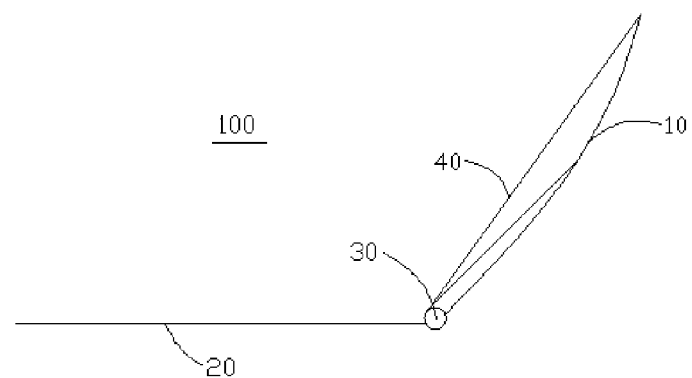
FIG. 14 is a schematic structural diagram of the electronic device in FIG. 13 in another state.

As shown in FIG. 13 and FIG. 14, the electronic device 100 includes an link mechanism 40 connected to the first body 10 or the second body 20, and when the first body 10 moves relative to the second body 20, the link mechanism 40 drives the surface to switch between the curved surface and the flat surface. In this manner, the switching of the surface between the curved surface and the flat surface is triggered by the motion of the first body 10 relative to the second body 20. In this embodiment, the link mechanism 40 is a traction belt, and an end of the traction belt is fixed on the second body 20. The surface is a deformable surface, for example, being formed of a flexible screen and a deformable frame.

When the first body 10 rotates relative to the second body 20, the surface of the first body 10 switches between the curved surface and the flat surface under the action of the link mechanism 40. In other embodiments, the link mechanism 40 may be fixed on the first body 10, and when the second body 20 rotates relative to the first body 10, the surface of the second body 20 switches between the curved surface and the flat surface under the action of the link mechanism 40.

In other embodiments, the link mechanism 40 may be fixed on the connector 30, so that the surface of the first body 10 or the second body 20 may switch between the curved surface and the flat surface.

Since the link mechanism 40 connected to the first body 10 or the second body 20 is provided, the link mechanism 40 may drive the surface to switch between the curved surface and the flat surface when the first body 10 moves relative to the second body 20, so that when it is needed to switch the surface to the curved surface, the link mechanism 40 controls the surface to switch to the curved surface, for facilitating the usage of the user; and after the usage is completed, the link mechanism 40 controls the surface to switch to the flat surface, for facilitating the handling and carrying the electronic device.

Figure 15:
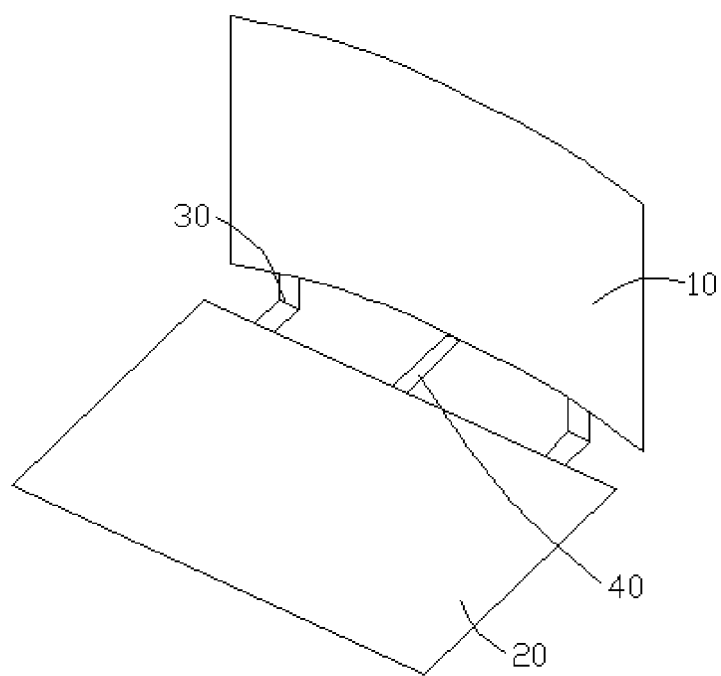
FIG. 15 is a schematic structural diagram of an electronic device according to an embodiment of the disclosure.

The surface may switch to the curved surface in a manner other than the one described above. As shown in FIG. 15, in this embodiment, the link mechanism 40 is a push component provided inside the second body 20, and part of the first body 10 is formed of an elastic material. After the rotation of the first body 10 relative to the second body 20 is completed, the push component is triggered to protrude, so as to push the surface of the first body 10 to switch from the flat surface to the curved surface. After the electronic device 100 is used, the push component is controlled to retract, the surface of the first body 10 switches back to the original shape, i.e., from the curved surface to the flat surface. In the above manner, after the motion of the first body 10 relative to the second body 20 is completed, the surface is controlled to switch between the curved surface and the flat surface.

Practically, the switching of the surface between the curved surface and the flat surface may also be triggered by the motion of the first body 10 relative to the second body 20. A driving mechanism may be added between the connector 30 and the push component. When the connector 30 moves, the push component is driven to protrude or retract, so as to control the surface of the first body 10 to switch between the flat surface and the curved surface.

Further, the push component may also be provided on the first body 10, and when or after the motion of the second body 20 relative to the first body 10, the push component protrudes or retracts, so as to control the surface of the first body 10 to switch between the flat surface and the curved surface.

Further, the switching of the surface between the flat surface and the curved surface may also be implemented in the following way. The second surface 12 is taken as an example below. The first output unit 121 is a flexible output unit, and the frame body for fixing the first output unit 121 has a deformable mechanism. When the second surface 12 needs to switch between the flat surface and the curved surface, the deformation and the deformed shape of the frame body are controlled, the shape of the first output unit 121 will change as the shape of the frame body changes, so that the switching of the second surface 12 between the flat surface and the curved surface is achieved.

Further, an lifting mechanism may be provided inside the first body 10 or the second body 20, and the switching of the surface between the flat surface and the curved surface is achieved by the raising or falling of the lifting mechanism. Alternatively, a rotation shaft may be provided on the surface, and the surface is divided into two parts which may rotate around the rotation shaft. When the surface needs to change, the rotation shaft may be controlled mechanically or electrically to rotate, to change the position relation between the two parts, so as to realize the switching of the surface between the flat surface and the curved surface.

In the above, the switching of the surface between the curved surface and the flat surface is controlled mechanically, and the switching of the surface between the curved surface and the flat surface is stable, reliable and energy-saved.

B. a parameter adjustment manner

At least a part of the surface is formed of a deformable material, such as a memory metal material or a ceramic material. If the surface is needed to switch between the flat surface and the curved surface, the control parameter of the material is adjusted, such as the temperature or the voltage of the memory metal material or the voltage of the ceramic material.

Figure 16:
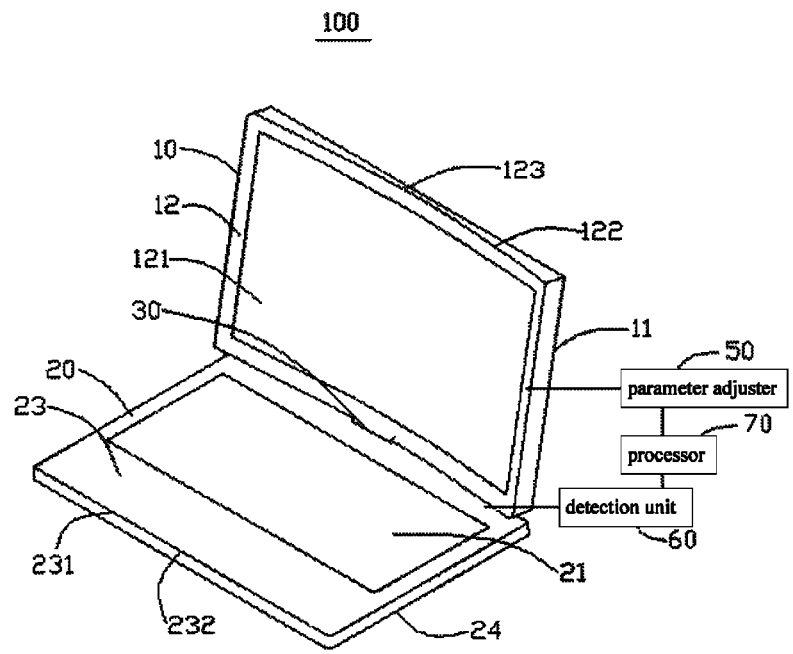
FIG. 16 is a schematic structural diagram of an electronic device according to an embodiment of the disclosure.

As shown in FIG. 16, the electronic device 100 further includes a parameter adjustor 50, a detection unit 60 and a processor 70. The parameter adjustor 50 is configured to adjust the control parameter of the surface, such as the temperature or the voltage, so that the surface switches between the curved surface and the flat surface.

The detection unit 60 is configured to detect a detection parameter for indicating a current distance between the first reference point 123 and the second reference point 232. The detection unit 60 may be an angle detector, a distance detector or a Hall device.

The processor 70 is configured to receive the detection parameter, and judge whether the current distance indicated by the detection parameter is less than the threshold, to determine whether to control the parameter adjustor 50 to adjust the control parameter.

In the above, the switching of the surface between the curved surface and the flat surface is controlled in a parameter adjustment manner, and the switching of the surface between the curved surface and the flat surface may be controlled accurately.

The connector 30 is described in detail below. It is mentioned in the above that the connector 30 may be a rotary connecting mechanism, a slidable connection mechanism, a combination of the rotary connecting mechanism and the slidable connection mechanism, or a plug-in connection mechanism, which are described in detail below.

A first solution is provided, in which the connector 30 is the rotary connecting mechanism.

The number of the rotation shaft may be one or two, as long as no interference is caused between the first body 10 and the second body 20 when the electronic device 100 switches between the first mode and the second mode. A space may be or not be provided between the rotation shaft and the first body 10 and the second body 20. Space between the rotation shaft and the first body 10 and space between the rotation shaft and the second body 20 may be the same or not. Further, the rotation shaft may be provided in a combined manner of the above, such as a single rotation shaft, a single rotation shaft with space between the rotation shaft and the first body and space between the rotation shaft and the second body, two rotation shafts with space between the two rotation shafts and the first body and space between the two rotation shafts and the second body, or a single rotation shaft with equally space between the rotation shaft and the first body and between the rotation shaft and the second body.

Detailed description is given by way of example.

As shown in FIG. 1, the connector 30 is a rotary connecting mechanism, the number of the rotary connecting mechanism is one, and the rotatable connection between the first body 10 and the second body 20 may be implemented only by the rotary connecting mechanism. The length of the rotary connecting mechanism may be set according to the curvature degree of the surface.

Figure 17:
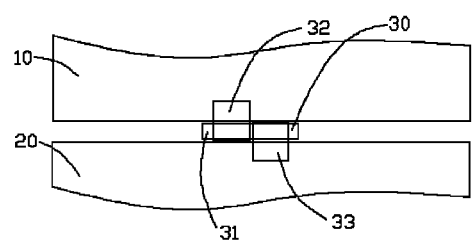
FIG. 17 is a partially enlarged view of the electronic device in FIG. 1.

As shown in FIG. 17, the connector 30 includes a rotation shaft 31, a first fix piece 32 and a second fix piece 33. An end of the first fix piece 32 is provided on the rotation shaft 31, and the other end of the first fix piece 32 is fixed on the first body 10. An end of the second fix piece 33 is provided on the rotation shaft 31, and the other end of the second fix piece 33 is fixed on the second body 20. The first body 10 is rotatable relative to the second body 20. The number of the first fix piece 32 and the second fix piece 33 may be set as required. The length of the rotation shaft 31 may be set according to the curvature degree of the surface. The length of the rotation shaft 31 may be 1 to 10 cm, preferably 3 to 4 cm. The diameter of the rotation shaft 31 may be 2 to 10 mm, preferably 4 to 5 mm.

Figure 18:
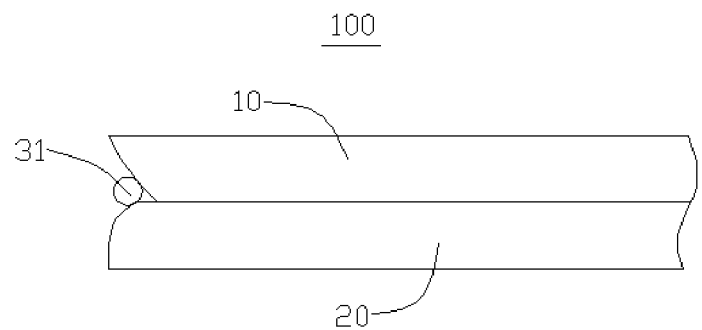
FIG. 18 is a schematic structural diagram of an electronic device according to an embodiment of the disclosure.

As shown in FIG. 18, the connector 30 includes the rotation shaft 31. In order to avoid the interference between the first body 10 and the second body 20 when the electronic device 100 switches between the first mode and the second mode, a shape of an end of the first body 10 where the first body 10 is connected to the rotation shaft 31 is different from a shape of an end of the second body 20 where the second body 20 is connected to the rotation shaft 31.

Figure 19:
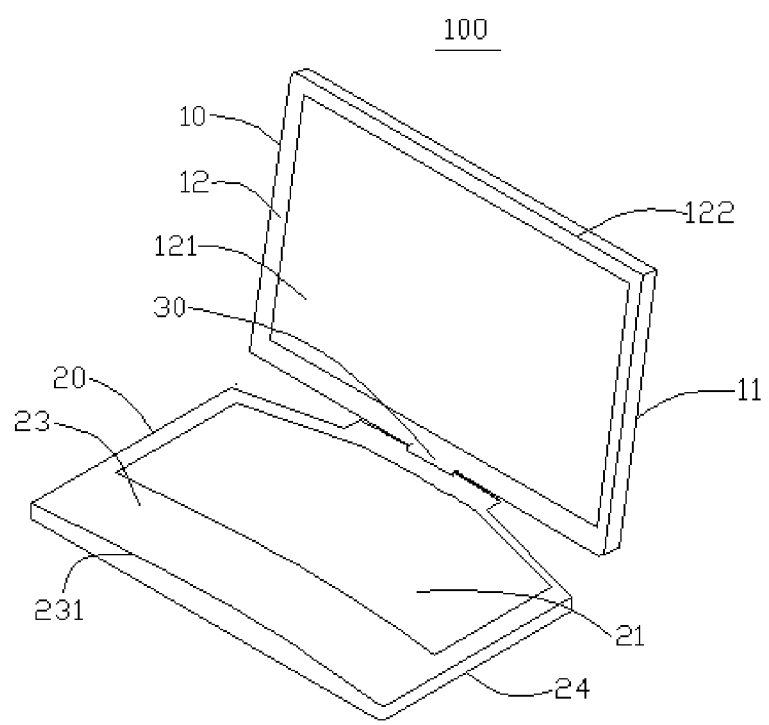
FIG. 19 is a schematic structural diagram of an electronic device according to an embodiment of the disclosure.

In this embodiment, ends of the first body 10 and the second body 20 at which the first body 10 and the second body 20 are connected to the rotation shaft 31 respectively are cut into different shapes, so that the shapes of the ends of the first body 10 and the second body 20 at which the first body 10 and the second body 20 are connected to the rotation shaft 31 respectively are different. In other embodiments, an end of the first body 10 at which the first body 10 is connected to the rotation shaft 31 is cut off partly, and an end of the second body 20 at which the second body 20 is connected to the rotation shaft 30 is kept unchanged; alternatively, an end of the second body 20 at which the second body 20 is connected to the rotation shaft 31 is cut off partly, and an end of the first body 10 at which the first body 10 is connected to the rotation shaft 30 is kept unchanged. As shown in FIG. 19, two ends of a lateral surface of the second body 20 at which the second body 20 is connected to the connector 30 is cut off, so that no interference is caused when the first body 10 or the second body 20 rotates relative to the second body 20 or the first body 10.

A space may be or not be provided between the rotation shaft and the first body 10 and between the rotation shaft and the second body 20, as long as no interference is caused between the first body 10 and the second body 20 when the electronic device 100 switches between the first mode and the second mode. In this embodiment, spaces between the rotation shaft and the first body 10 and between the rotation shaft and the second body 20 refer to the spaces between the axis of the rotation shaft and the first body 10 and between the axis of the rotation shaft and the second body 20.

Figure 20:
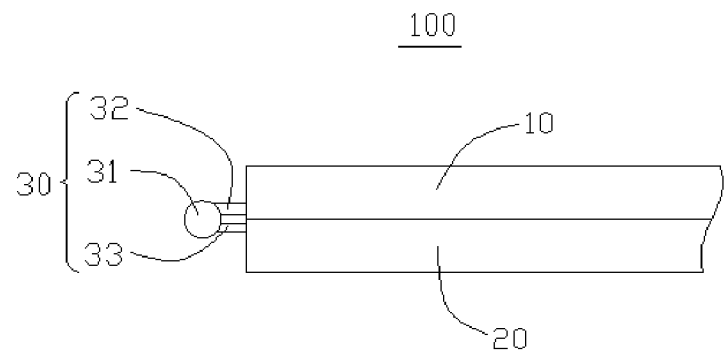
FIG. 20 is a schematic structural diagram of an electronic device according to an embodiment of the disclosure.

In this embodiment, as shown in FIG. 20, the rotation shaft 31 has at least a first position state, and when the rotation shaft 31 is in the first position state, a space is provided at least between the rotation shaft 31 and the first body 10 or the second body 20, so that the first body 10 rotates relative to the second body 20 and the electronic device 100 switches between the first mode and the second mode. That is to say, a space may be provided between the rotation shaft 31 and one of the first body 10 and the second body 20, alternatively spaces may be provided both between the rotation shaft 31 and the first body 10 and between the rotation shaft 31 and the second body 20. In this embodiment, spaces are provided both between the rotation shaft 31 and the first body 10 and between the rotation shaft 31 and the second body 20, and the spaces are the same. The space between the rotation shaft 31 and the first body 10 or the second body 20 may be kept all the time, alternatively the space between the rotation shaft 31 and the first body 10 or the second body 20 may be provided by position variation.

In the case that spaces are provided both between the rotation shaft 31 and the first body 10 and between the rotation shaft 31 and the second body 20, the spaces may be the same or not. In this embodiment, spaces are provided both between the rotation shaft 31 and the first body 10 and between the rotation shaft 31 and the second body 20, and the space between the rotation shaft 31 and the first body 10 is not the same as the space between the rotation shaft 31 and the second body 20.

Figure 21:
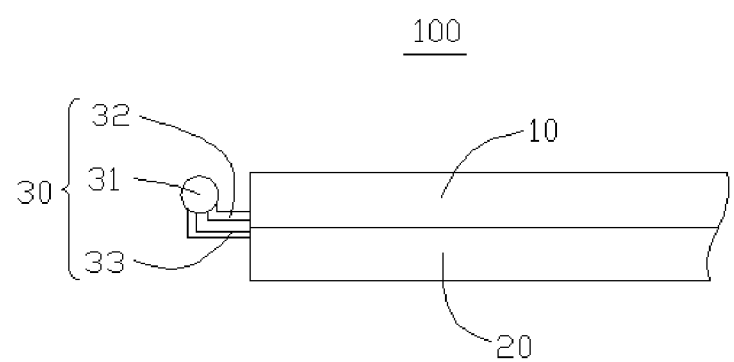
FIG. 21 is a schematic structural diagram of an electronic device according to an embodiment of the disclosure.

As shown in FIG. 21, the space between the first rotation shaft 31 and the first body 10 is not the same as the space between the first rotation shaft 31 and the second body 20. In this embodiment, the space between the first rotation shaft 31 and the first body 10 is less than the space between the first rotation shaft 31 and the second body 20, and the first rotation shaft 31 is located in a position nearer to the first body 10 on the same sides of the first body 10 and the second body 20. In other embodiments, the space between the first rotation shaft 31 and the first body 10 is greater than the space between the first rotation shaft 31 and the second body 20, and the first rotation shaft 31 is located in a position nearer to the second body 20 on the same sides of the first body 10 and the second body 20.

Since the space between the first rotation shaft 31 and the first body 10 is provided to be not the same as the space between the first rotation shaft 31 and the second body 20, and interference that is caused between the first body 10 and the second body 20 during the relative rotation between the first body 10 and the second body 20 is further avoided, and the opening procedure of the electronic device 100 is more smoothly.

A second solution is provided, in which the connector 30 is a combination of at least two mechanisms, such as a combination of a rotary connecting mechanism and a slidable connection mechanism. The two mechanisms may be the same or not.

The space between the rotation shaft 31 and the first body 10 or the second body 20 may be constant or variable. The rotation shaft 31 further has a second position state different from the first position state, and the rotation shaft 31 is switchable from the second position state to the first position state, to provide a space at least between the rotation shaft 31 and the first body 10 or the second body 20. That is to say, in the case that the rotation shaft 31 is in the second position state, the space may be or may be not provided between the rotation shaft and the first body 10 and between the rotation shaft and the second body 20. And in the case that spaces are provided between the rotation shaft and the first body 10 and between the rotation shaft and the second body 20, the spaces in the second position state of the rotation shaft 31 are different from the spaces in the first position state.

The switching of the rotation shaft 31 between the first position state and the second position state may be implemented by adding a rotation shaft or a slidable connection mechanism. The solution implemented by adding a rotation shaft is described firstly below.

Figure 22:
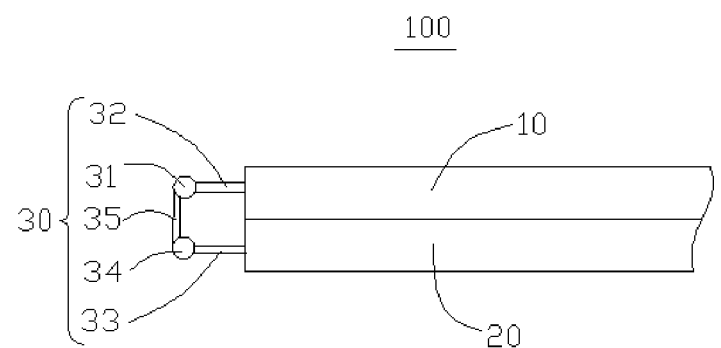
FIG. 22 is a schematic structural diagram of an electronic device according to an embodiment of the disclosure.

Firstly, the following solution is described, in which a combination of two same mechanisms is adopted and the connector is implemented as two rotary connecting mechanisms, i.e. two shafts. As shown in FIG. 22, the connector 30 further includes a rotation shaft 34 and a connection part 35. The rotation shaft 34 is connected to the second body 20 via a second fix piece 33, so that the second body 20 is rotatable relative to the rotation shaft 34. The rotation shaft 31 is connected to the first body 10 via the first fix piece 32, so that the first body is rotatable relative to the rotation shaft 31. The connection part 35 is connected between the rotation shaft 31 and the rotation shaft 34, so that the rotation shaft 31 and the rotation shaft 34 are rotatable relative to each other. If the first body 10 needs to rotate relative to the second body 20, the first body 10 firstly rotates around the rotation shaft 31, and the rotation shaft 31 switches between the first position state and the second position state when the first body 10 rotates to a limit angle with respect to the rotation shaft 31. Then the first body 10 and the rotation shaft 31 rotate around the rotation shaft 34. With the connector 30 implemented in the above manner, the first body 10 may rotate relative to the second body 20 by 360 degrees, so that the electronic device 100 can switches into a usage state of a tablet computer.

Figure 23:
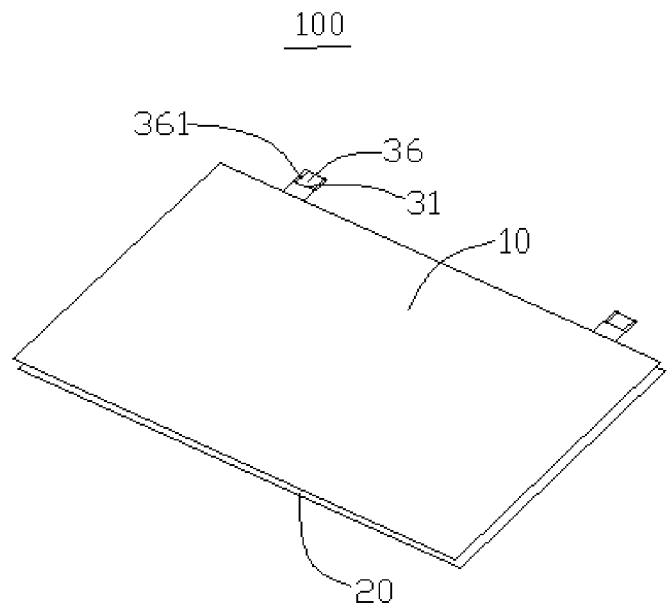
FIG. 23 is a schematic structural diagram of an electronic device according to an embodiment of the disclosure.
Figure 24:
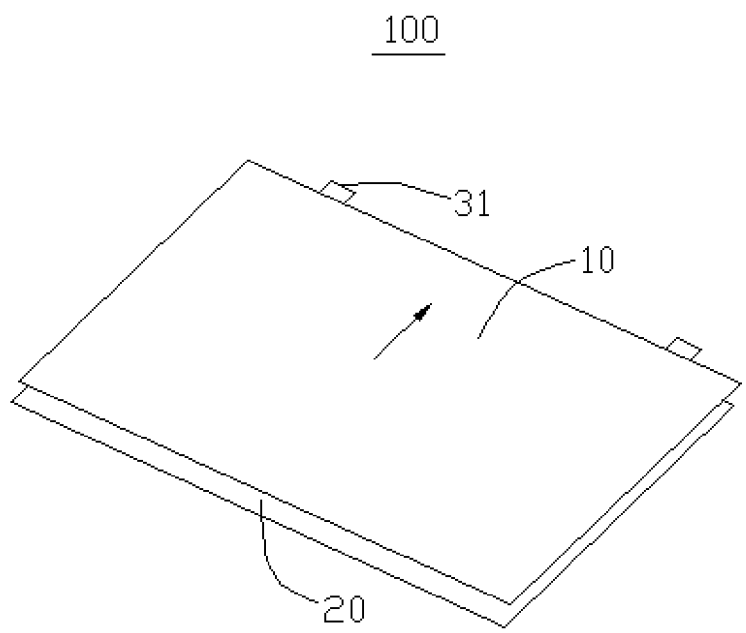
FIG. 24 is a schematic structural diagram of the electronic device in FIG. 23 in another state.
Figure 25:
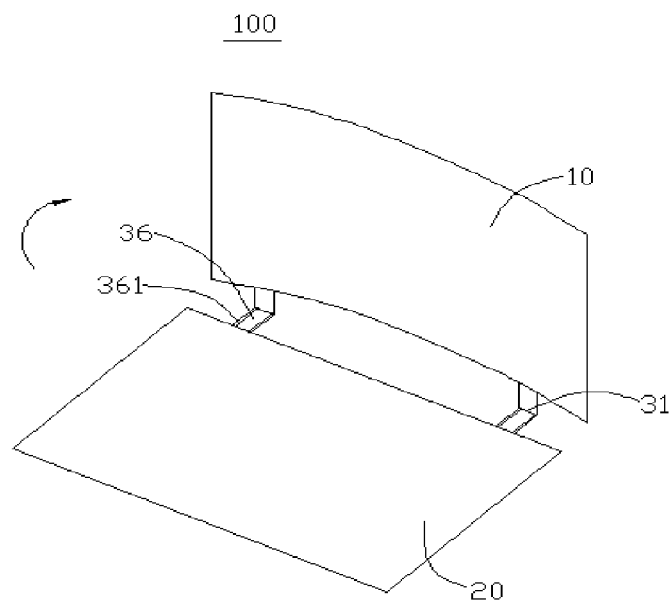
FIG. 25 is a schematic structural diagram of the electronic device in FIG. 23 in another state.

The following solution is described, in which a combination of two different mechanisms is adopted and a slidable connection mechanism is added for achieving the switching of the rotation shaft 31 between the first position state and the second position state. As shown in FIG. 23 to FIG. 25, the connector 30 further includes a sliding rail 36 on which sliding groove 361 is provided, the rotation shaft 31 is provided inside the sliding groove 361 and is rotatable and movable inside the sliding groove 361. By moving the rotation shaft 31 inside the sliding groove 361, the rotation shaft 31 switches between the first position state and the second position state.

In this embodiment, the sliding rail 36 is fixed on the second body 20. When the electronic device 100 needs to switch from the second mode to the first mode, the first body 10 drives the rotation shaft 31 to move inside the sliding groove 361, so that the rotation shaft 31 switches from the second position state to the first position state. When the rotation shaft 31 switches to the first position state, the first body 10 rotates relative to the second body 20 by means of the rotation shaft 31, so that the electronic device 100 switches from the second mode to the first mode. The procedure of switching the electronic device 100 from the first mode to the second mode is an inverse procedure of the above, and is not descried in detail here.

In other embodiments, the sliding rail 36 may be fixed on the first body 10, and the switching of the rotation shaft 31 between the first position state and the second position state may also be achieved. In the above solution, the sliding rail 36 is provided so that rotation shaft 31 can switch between a state in which a space is provided between rotation shaft 31 and the first body 10 or the second body 20 and a state in which no space is provided between rotation shaft 31 and the first body 10 or the second body 20. After the rotation shaft 31 slides from a first position of the sliding rail 36 to a second position of the sliding rail 36, the first body 10 and the second body 20 are rotatable relative to each other, so that the electronic device is in the second mode, and the rotation shaft 31 may slide from the second position to the first position, for compacting the electronic device 100 in the second mode and reducing space occupied by the electronic device 100. Further, the gap between the first body 10 and the second body 20 of the electronic device 100 in the second mode may also be reduced.

In addition to the above solution in which a rotary connecting mechanism and a slidable connection mechanism are adopted, two slots may be provided on the first fix piece 32 or the second fix piece 33. The rotation shaft 31 may be provided in any one of the two slots, and the spaces between the two slots and the first body 10 or the second body 20 are different.

A third solution is provided, in which the connector 30 is a slidable connection mechanism.

Figure 26:
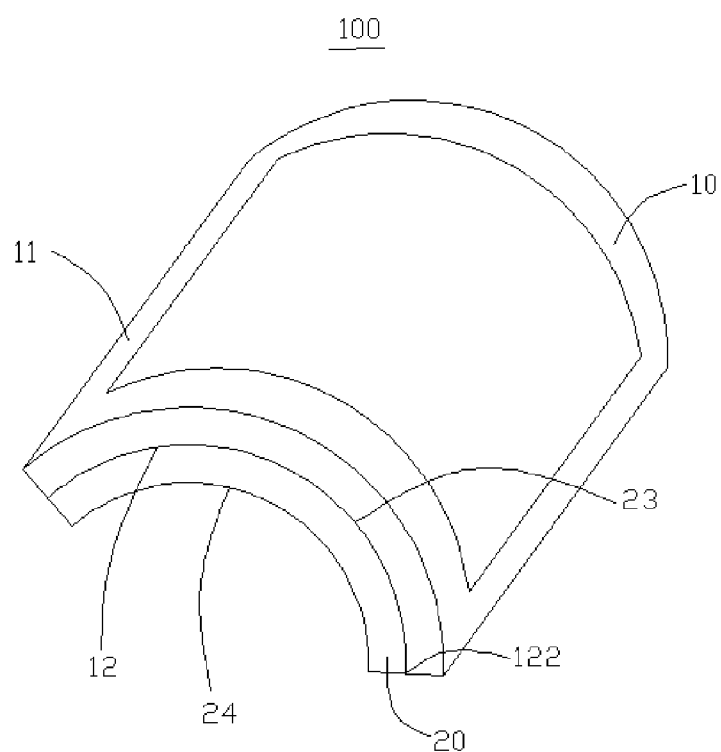
FIG. 26 is a schematic structural diagram of an electronic device according to an embodiment of the disclosure.
Figure 27:
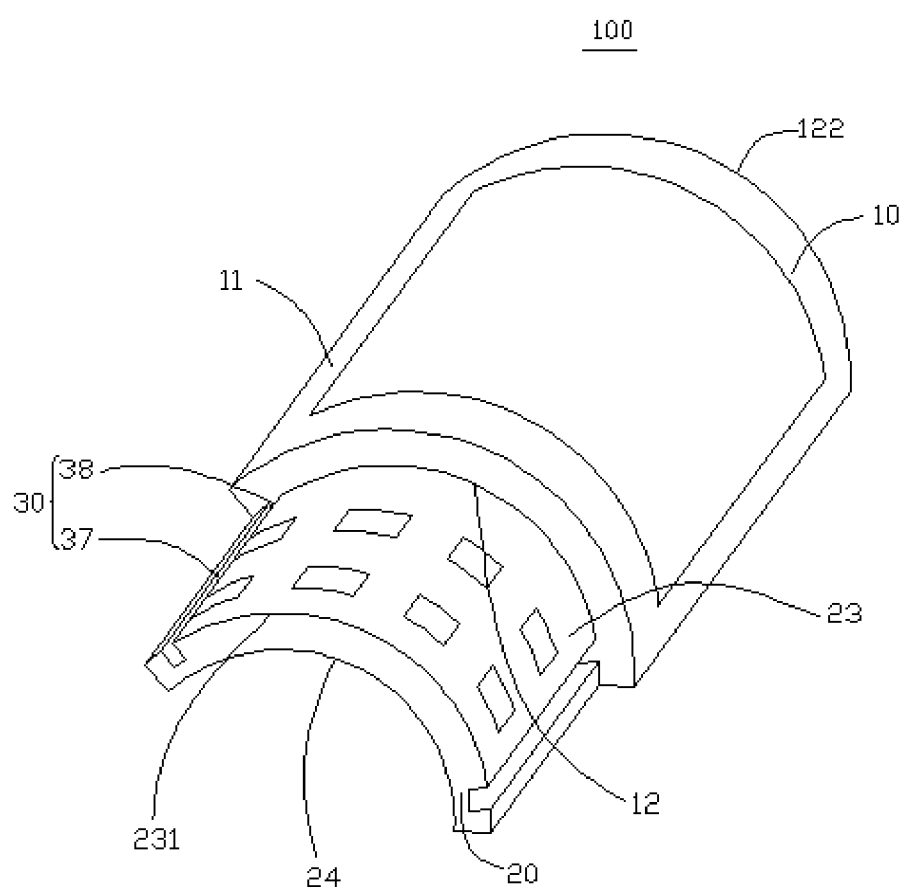
FIG. 27 is a schematic structural diagram of the electronic device in FIG. 25 in another state.
Figure 28:
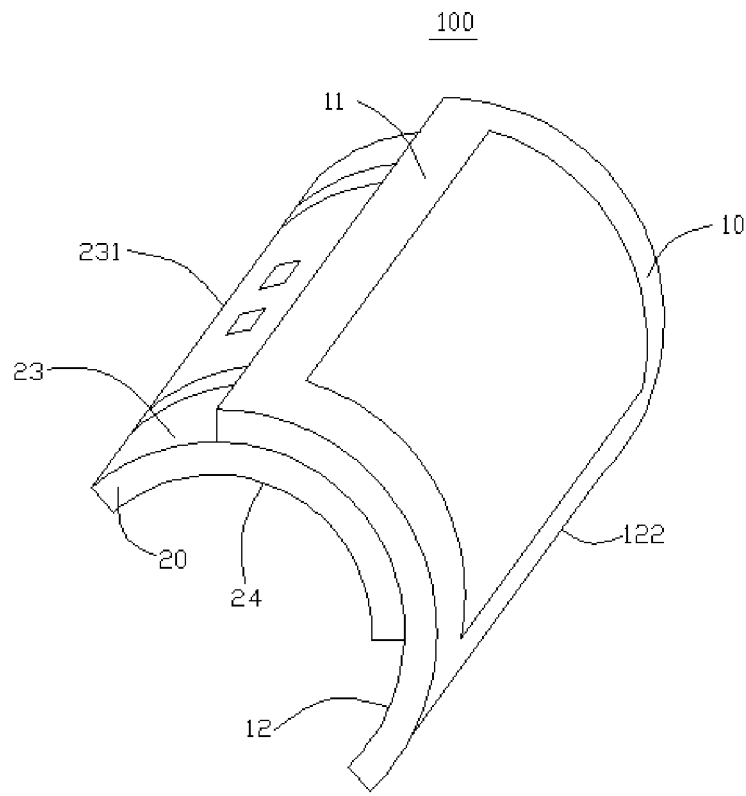
FIG. 28 is a schematic structural diagram of an electronic device according to an embodiment of the disclosure.

As shown in FIG. 26 and FIG. 27, the second surface 12 and the third surface 23 are curved surfaces having the same curved surface equations, the first side 122 is a straight line, the connector 30 is a slidable connection mechanism for connecting the second surface 12 and the third surface 23. The first body 10 and the second body 20 are slidable relative to each other by means of the slidable connection mechanism, so that the connector 30 is in the second state different from the first state and the electronic device 100 is in the second mode different from the first mode. The slidable connection mechanism includes a sliding groove 37 and a sliding bar 38. The sliding groove 37 is provided on one of the first body 10 or the second body 20, and the sliding bar 38 is provided on the other one of the first body 10 or the second body 20. In this embodiment, the extending direction of the sliding groove 37 is the same as the extending direction of the first side 122, and the first body 10 and the second body 20 are slidable relative to each in the extending direction of the first side 122. As shown in FIG. 28, the extending direction of the sliding groove 37 is the same as the curving direction of the third surface 23, and first body 10 and the second body 20 are slidable in the curving direction of the curved surface. In this embodiment, the first surface 11 and the fourth surface 24 each are curved surfaces. In other embodiments, the first surface 11 and the fourth surface 24 each may be flat surfaces, as long as the second surface 12 and the third surface 23 each are curved surfaces.

In this embodiment, when the electronic device 100 is in the second mode, the threshold is equal to or greater than the square root of the sum of the square of the distance between the first reference point 123 and the second reference point 232 and the square of the result obtained by adding the distance between the first body 10 to the second body 20 to the thickness of the first body 10.

Figure 29:
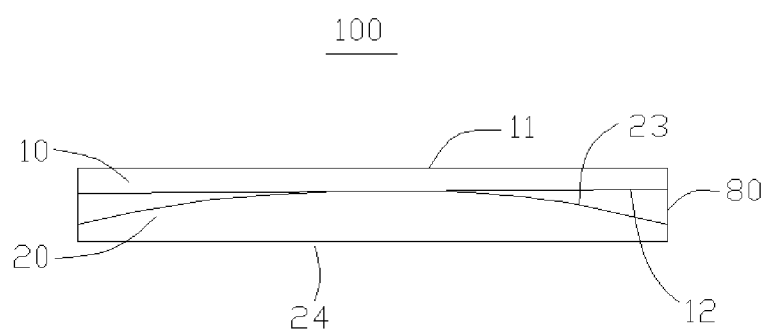
FIG. 29 is a schematic structural diagram of an electronic device according to an embodiment of the disclosure.

Further, in the case that at least one surface of the second surface 12 and the third surface 23 is a curved surface, i.e., one of the second surface 12 and the third surface 23 is a curved surface, or the two surfaces each are curved surfaces but not matching, as shown in FIG. 29, the second surface 12 on which the first output unit 121 is set is provided as a flat surface, and the third surface 23 on which the first input unit 21 is set is provided as a convex curved surface, a space is provided between the edges of the second surface 12 and the third surface 23 when the electronic device is in the second mode. In order to prevent dust, debris and the like from entering into the space between the second surface 12 and the third surface 23, the electronic device 100 further includes a shielding part 80 provided on the first body 10 or the second body 20. The shielding part may be exposed out of the first body 10 or the second body 20, or may be provided on the first body 10 or the second body 20 telescopically. When the electronic device 100 is in the second mode, the space provided between edges of the second surface 12 and the third surface 23 is sheltered by the shielding part 80.

In other embodiments, if the second surface 12 on which the first output unit 121 is set is provided as a convex curved surface, and the third surface 23 on which the first input unit 21 is set is provided as a flat surface, or the second surface 12 and the third surface 23 are provided as different curved surfaces, the shielding part 80 may also be provided when the electronic device 100 is in the second mode and the space is provided between the second surface 12 and the third surface 23.

In this solution, the shielding part 80 is provided on the first body 10 or the second body 20, and the shielding part 80 shields the space between the edges of the second surface 12 and the third surface 23 when the electronic device 100 is in the second mode, so as to prevent dust, debris and the like from entering into the space between the second surface 12 and the third surface 23.

Although preferred embodiments of the disclosure have been described, further alternations and modifications may be made to these embodiments by those skilled in the art based on the basic creative conception. The appended claims are intended to be interpreted as including the preferred embodiments and all the alternations and modifications falling within the scope of the disclosure.

A switching method applicable to an electronic device is provided in an embodiment of the disclosure, the electronic device includes a first body, a second body and a connector; the first body at least includes a first surface and a second surface which are opposite to each other; the second body at least includes a third surface and a fourth surface which are opposite to each other; the connector connects the first and second bodies; and the first body and the second body are movable with respect to each other by means of the connector, to make the electronic device switch at least between a first mode and a second mode differing from the first mode; the method includes: changing at least one of the first, second, third and fourth surfaces when the electronic device is switched between the first and second modes, and the changing includes a switching between a flat surface and a curved surface or a switching between two different curved surfaces.

In the above switching method, at least one surface of the first, second, third and fourth surfaces is switched between a flat surface and a curved surface or between two different curved surfaces when the electronic device is switched between the first and second modes, so that the electronic device may meet requirements of different scenarios and it is solved the problem in the conventional technology that the electronic device can not meet requirements of different scenarios, since the first, second, third and fourth surfaces are each maintained to be an original shape in a process that the electronic device is switched between the first and second modes.

Firstly, the electronic device is described before the switching method is described. As shown in FIG. 1, a schematic structural diagram of an electronic device according to a first preferred embodiment of the present disclosure is provided Detailed illustrations of FIG. 1 may be referred above, and is not repeated herein. The first body 10 and the second body 20 are connected by the connector 30, so that the first body 10 and the second body 20 are movable with respect to each other by means of the connector 30 and the electronic device 100 is at least capable of switching between a first mode and a second mode differing from the first mode. The connector 30 may be a rotary connecting mechanism, a sliding connection mechanism, a combination of the rotary connecting mechanism and the sliding connection mechanism, or a plug-in connection mechanism. In the case that the electronic device 100 in the first mode, the connector 30 is in a first state and a distance between the first reference point 123 on the first side 122 of the second surface 12 and the second reference point 232 on the second side 231 of the third surface 23 is greater than a threshold. In the case that the electronic device 100 is in the second mode, the connector 30 is in a second state differing from the first state, and the distance between the first reference point 123 and the second reference point 232 is less than or equal to the threshold. In a specific embodiment, the threshold may be set as needed. For example, it may be set as any value such as 5 millimeter, 1 centimeter, 3 centimeter or 5 centimeter.

The first mode may be an input/output mode, i.e. a mode when the electronic device operates. If the first mode is the input/output mode, the second mode may be a non-input/non-output mode or another input/output mode differing from the above input/output mode.

In the case that the electronic device 100 is in the first mode, the first surface 11, the second surface 12 and the third surface 23 may be curved surfaces or flat surfaces, or one is a curved surface and the others are flat surfaces. In the embodiment, it is described only by taking the case that the second surface 12 is a curved surface when the electronic device 100 is in the first mode as an example. In other embodiments, it is not limited that the second surface 12 is the curved surface; the first surface 11, the third surface 23 or the fourth surface 24 may also be a curved surface; or the second surface 12 may also be a flat surface.

The switching method is applied in the electronic device 100. The method includes: changing at least one of the first surface 11, the second surface 12, the third surface 23 and the fourth surface 24 when the electronic device 100 is switched between the first and second modes. The changing includes a switching between a flat surface and a curved surface or a switching between two different curved surfaces. That is to say, one or more of the first surface 11, the second surface 12, the third surface 23 and the fourth surface 24 may be switched to curved surfaces from flat surfaces or switched to the flat surfaces from the curved surfaces or switched between two curved surfaces. For example, when the electronic device 100 is switched to the first mode, the second surface 12 is controlled to change into a concave curved surface to improve a display effect of the first output unit 121.

Moreover, the surface may be changed along with the mode switching of the electronic device 100, or before or after the mode switching of the electronic device 100.

In the above switching method, at least one surface of the first surface 11, the second surface 12, the third surface 23 and the fourth surface 24 is switched between a flat surface and a curved surface or between two different curved surfaces when the electronic device 100 is switched between the first and second modes, so that the electronic device may meet requirements of different scenarios and it is solved the problem in the conventional technology that: the electronic device can not meet requirements of different scenarios, since the first, second, third and fourth surfaces are each maintained to be an original shape in a process that the electronic device is switched between the first and second modes.

In the following, a change status of the surface when the electronic device 100 is switched between the first and second modes is described by way of example.

FIRST EXAMPLE

Referring to FIG. 1, when the electronic device 100 is switched from the second mode to the first mode, the display unit is switched to a display unit having a shape of concave curved surface with respect to the first body 10, and the display unit is located on the same side of any tangent plane of the display unit and only one side corresponding to the first side 122 on the display unit is a curved side.

When the electronic device 100 is in the second mode, the display unit may be a curved surface differing from the above "concave curved surface", or may be a flat surface. When the electronic device 100 is switched from the second mode to the first mode, the first surface 11, the third surface 23 and the fourth surface 24 may be changed or not changed, may be a curved surface or a flat surface. In the embodiment, the first surface 11, the third surface 23 and the fourth surface 24 are flat surfaces.

In the above, the display unit is switched to the display unit which is a concave curved surface with respect to the first body 10 when the electronic device 100 is switched from the second mode to the first mode; hence differences between points on the display unit and corresponding points on an eyeball of a viewer may be reduced and a flat surface radian may be adjusted to ensure the differences between points on the display unit and the eye being equal. Thus, the user has a better sensory experience, especially for the device having the display unit with a size greater than 7 inches.

In the embodiment, a side on the display unit corresponding to the first side 122 is a curved side, that is, the first output unit 121 is an incomplete cylinder formed by rotating a straight line about a center point. Since the first output unit 121 is set as a display unit which is a concave curved surface with respect to the first body 10 and the side on the first output unit 121 corresponding to the first side 122 is set as the curved side, difference values between points on the display unit and corresponding points on an eyeball of a viewer may be reduced and a flat surface radian may be adjusted to ensure the difference values between the display unit and the eye are equal. Thus, the user has a better sensory experience, especially for the device having the display unit with a size greater than 7 inches.

SECOND EXAMPLE

Figure 30:
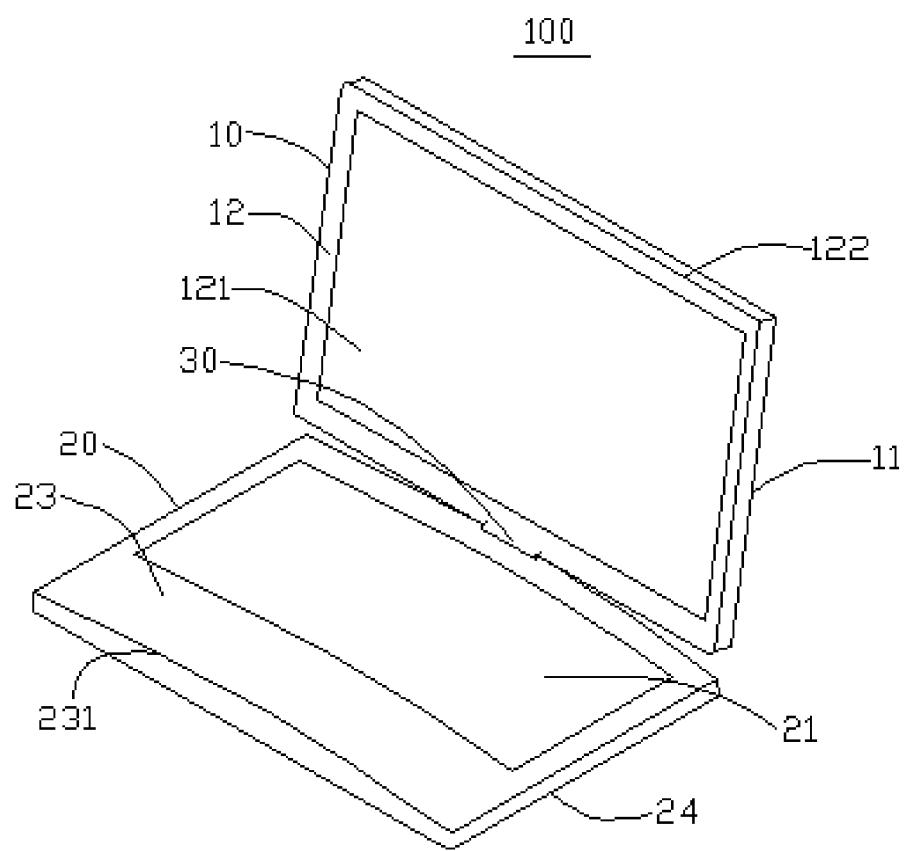
FIG. 30 is a schematic structural diagram of an electronic device according to an embodiment of the present disclosure.

Referring to FIG. 30, the first input unit 21 may be a contact input unit such as a touch sensing unit and/or a keyboard. When the electronic device 100 is switched from the second mode to the first mode, the contact input unit is switched to a contact input unit which has a convex curved surface with respect to the body 20 or is arranged along the convex curved surface. The contact input unit is located on the same side of any tangent plane thereof and only a side thereon corresponding to the second side 231 is a curved side.

That is to say, the first input unit 21 is switched to an un-complete cylindrical shape formed by a straight line rotating around a center point when the electronic device 100 is switched from the second mode to the first mode. And the contact input unit may be a curved surface differing from the above "convex curved surface" or "along the convex curved surface" or may be a flat surface when the electronic device 100 is in the second mode. When the electronic device 100 is switched from the second mode to the first mode, the first surface 11, the second surface 12 or the fourth surface 24 may be changed or not changed, may be a curved surface or a flat surface. In the embodiment, the first surface 11, the second surface 12 and the fourth surface 24 are flat surfaces.

Since the first input unit 21 is switched to the contact input unit which has the convex curved surface with respect to the second body 20 or is arranged along the convex curved surface, and a side on the contact input unit corresponding to the second side 231 is a curved side when the electronic device 100 is switched from the second mode to the first mode, the first input unit 21 is more ergonomic curve design, and more comfortable to use, in particular in a case that the user inputs with the first input unit 21 (physical or virtual) for a long time.

THIRD EXAMPLE

Two of the first, second, third and fourth surfaces are changed and shapes of the two changed surfaces match with each other or consistent with each other, when the electronic device is switched between the first and second modes.

As shown in FIG. 7, when the electronic device 100 is switched to the second mode, the second surface 12 and the third surface 23 are changed into surfaces matching with each other, so that the structure of the electronic device in the second mode is more compact. The first surface 11 and the fourth surface 24 may be curved surfaces or flat surfaces. When the electronic device 100 is switched to the second mode, the first surface 11 and the fourth surface 24 may be changed or not changed. In the embodiment, the third surface 23 is a convex surface and the second surface 12 is a concave surface. In other embodiments, the third surface 23 may be the concave surface and the second surface 12 may be the convex surface.

Figure 31:
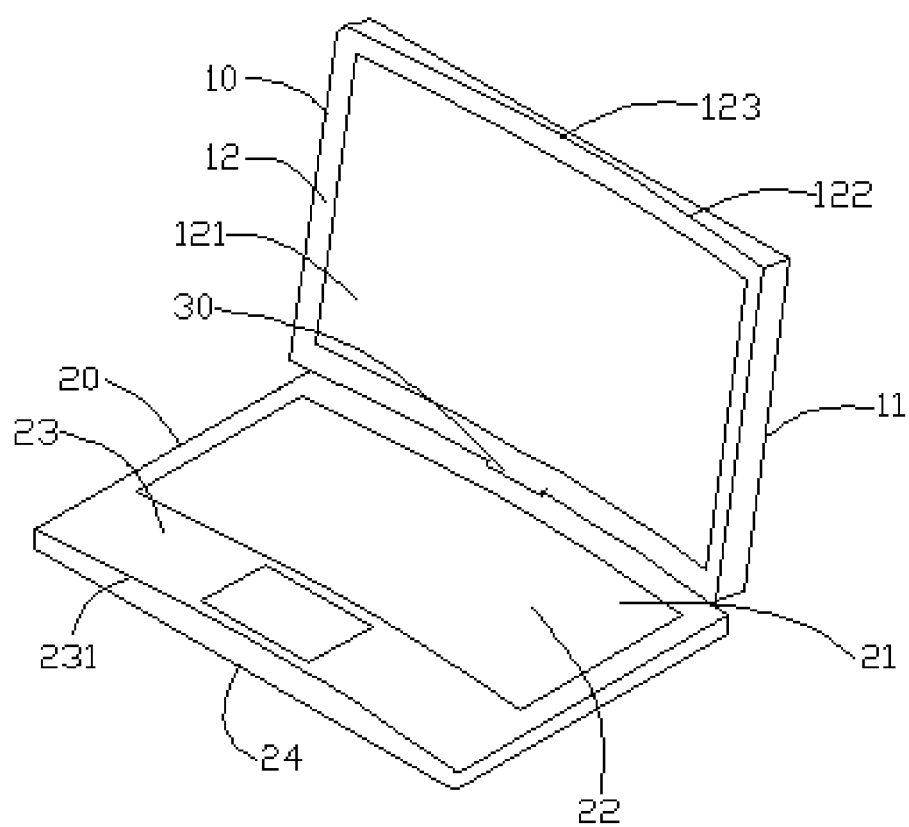
FIG. 31 is a schematic structural diagram of an electronic device according to an embodiment of the present disclosure.

As shown in FIG. 31, in the case that the electronic device 100 is in the first mode, the second surface 12 and the third surface 23 are curved surfaces matching with each other. In the embodiment, the third surface 23 is a convex surface and the second surface 12 is a concave surface. In other embodiments, the third surface 23 may be the concave surface and the second surface 12 may be the convex surface.

As shown in FIG. 10, when the electronic device is switched to the second mode, shapes of the first surface 11 and the fourth surface 24 are consistent with each other, so that the recognition of the electronic device 100 is improved. In the embodiment, the first surface 11 is a convex surface and the fourth surface 24 is a concave surface. In other embodiments the first surface 11 is the concave surface and the fourth surface 24 is the convex surface. In the case that the electronic device 100 is in the second mode, since the first surface 11 is the convex surface and the fourth surface 24 is the concave surface, the first surface 11 and the fourth surface 24 may act as a buffer when the electronic device 100 is dropped, for reducing the probability that the electronic device 100 is broken and protecting the electronic device 100. Further, the appearance of the electronic device 100 may be designed more specially, for increasing the difference between the electronic device 100 and other products and improving the recognition of the electronic device 100.

FOURTH EXAMPLE

Figure 32:
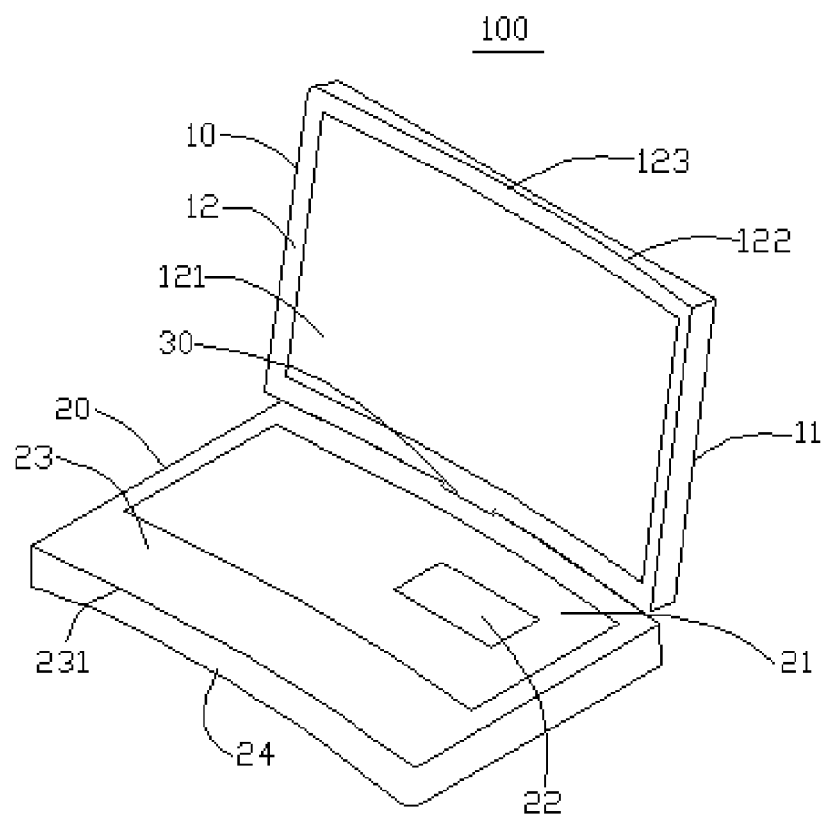
FIG. 32 is a schematic structural diagram of an electronic device according to an embodiment of the present disclosure.

As shown in FIG. 32, when the electronic device 100 is switched from the second mode to the first mode, the second surface 12 is switched to a curved surface which is concave with respect to the first body 10, the third surface 23 is switched to a curved surface which is convex with respect to the second body 20 and the fourth surface 24 is switched to a curved surface which is concave with respect to the second body 20. In the embodiment, the curved surface is located on the same side of any tangent plane thereof. On the second surface 12, the first side 122 and a side corresponding to the first side 122 are curved sides, and on the third surface 23 and the fourth surface 24, sides corresponding to the second side 231 are curved sides.

In the above, the second surface 12 is switched to a curved surface which is a concave curved surface with respect to the first body 10 and the third surface 23 is switched to a curved surface which is convex with respect to the second body 20 when the electronic device 100 is switched from the second mode to the first mode. Hence, the differences between points on the display unit and corresponding points on the eyeball of the viewer may be reduced and the flat surface radian may be adjusted to ensure the differences between points on the display unit and the eye are equal, the user has a better sensory experience, especially for the device having the display unit with a size greater than 7 inches. Moreover, the first input unit 21 is more ergonomic curve design, and more comfortable to use, in particular in a case that the user inputs with the first input unit 21 (physical or virtual) for a long time.

FIFTH EXAMPLE

Figure 33:
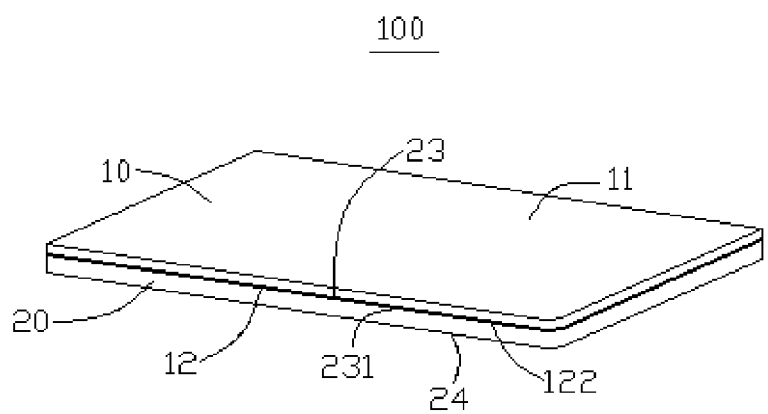
FIG. 33 is a schematic structural diagram of an electronic device according to an embodiment of the present disclosure.

As shown in FIG. 33, when the electronic device 100 is switched from the first mode to the second mode, a surface among the first surface 11, the second surface 12, the third surface 23 and the fourth surface 24, which is a curved surface, is switched to a flat surface. In the case that the electronic device 100 is in the first mode, at leas one of the first surface 11, the second surface 12, the third surface 23 and the fourth surface 24 is a curved surface which is switched to a flat surface when the electronic device 100 is switched to the second mode. It is convenient to carry and transmit the electronic device 100 since the surface among the first surface 11, the second surface 12, the third surface 23 and the fourth surface 24, which is the curved surface, is switched to the flat surface when the electronic device 100 is switched from the first mode to the second mode.

In the above switching method, the surface may be switched at least in two ways as follows.

First: Parameter Adjusting Method

The changing at least one of the first surface 11, the second surface 12, the third surface 23 and the fourth surface 24 specifically includes the following steps:

detecting a detection parameter indicating that the electronic device 100 is switched between the first and second modes; and determining, based on the detection parameter, whether to control a parameter adjuster to adjust a control parameter for controlling the surface to change.

In this case, a material of at least a portion of the surface is a deformable material such as a memory metal material and a ceramic material, and so on. In the case that the surface needs to be switched between a flat surface and a curved surface, the control parameter of the material is adjusted, for example, the temperature or voltage of the memory metal is adjusted, or the voltage of the ceramic material is adjusted, to make the surface switch between the flat surface and the curved surface.

The electronic device 100 as illustrated in FIG. 16 is described in detail before, and is not repeated herein.

Second: Mechanical Adjustment Method

The electronic device 100 further includes a link mechanism connected to the first body 10, the second body 20 or the connector 30, the link mechanism is configured to drive the surface to change. And the controlling at least one of the first surface 11, the second surface 12, the third surface 23 and the fourth surface 24 to change is specifically that: driving, by the link mechanism, the surface to change. The detailed process is described above and not repeat herein.

The surface switching may be performed during the mode switching of the electronic device 100, or may be performed before or after the mode switching, or may further be generated accompanying with the mode switching of the electronic device 100.

First, the surface is switched accompanying with the mode switching of the electronic device 100.

Specifically, in a process that the electronic device 100 is switched between the first and second modes, the surface is changed as the electronic device 100 is switched between the modes, so that the surface is changed when the mode of the electronic device 100 is switched.

As shown in FIG. 16, the processor 50 may control a deformation degree of the surface based on a change amplitude of the parameter in the case that the detection unit 60 detects a parameter change. Thus the surface is changed while the mode of the electronic device is switched.

Further, as shown in FIGS. 13 and 14, the surface may also be changed as the electronic device 100 is switched between the modes, since the surface of the first body 10 is switched between a curved surface and a flat surface under an applied force of the link mechanism 40 when the first body 10 rotates with respect to the second body 20.

Second: the surface is switched before or after the mode switching.

That is, the surface is started to be changed after the electronic device 100 is switched from the second mode to the first mode.

As shown in FIG. 16, the processor 50 may judge whether the electronic device 100 completes the mode switching based on the detection parameter detected by the detection unit 60 and control the surface to change, so as to start to change the surface after the electronic device 100 completes the mode switching. For example, the second surface and the third surface are changed after the electronic device is switched from the second mode to the first mode.

The present disclosure further provides an electronic device 100, including a first body 10, a second body 20, a connector 30 and a processor 70. The first body 10 at least includes a first surface 11 and a second surface 12 which are opposite to each other; the second body 20 at least includes a third surface 23 and a fourth surface 24 which are opposite to each other; the connector 30 is configured to connect the first body 10 and second body 20 to make the first body 10 and second body 20 move with respect to each other by means of the connector 30 and to make the electronic device 100 switch at least between a first mode and a second mode differing from the first mode; and the processor 70 is configured to change at least one of the first, second, third and fourth surfaces when the electronic device is switched between the first and second modes; wherein the changing includes a switching between a flat surface and a curved surface or a switching between two different curved surfaces.

Preferably, in the case that the electronic device 100 is in the first mode, the connector 30 is in a first state, a distance between a first reference point 123 on a first side 122, which is away from the second body 20, of the second surface 12 and a second reference point 232 on a second side 231, which is away from the first body 10, of the third surface 23 is larger than a threshold, and the position of the first reference point 123 on the first side 122 corresponds to the position of the second reference point 232 on the second side 231.

In the case that the electronic device 100 is in the second mode, the connector 30 is in a second state and the distance between the first reference point 123 and second reference point 232 is less than a threshold.

Preferably, the electronic device 100 further includes a detection unit 60 configured to detect a detection parameter indicating that the electronic device 100 is switched between the first and second modes.

The processor 70 is specifically configured to determine, based on the detection parameter, whether to control a parameter adjuster 50 to adjust a control parameter for controlling the surface to change.

Preferably, the electronic device 100 further includes a link mechanism connected to the first body 10, the second body 20 or the connector 30, the link mechanism is configured to drive the surface to change; and the processor 70 is specifically configured to: make the link mechanism drive the surface to change.

Preferably, the processor 70 is specifically configured to: change, in a process that the electronic device 100 is switched between the first and second modes, the surface as the electronic device is switched between the modes, to make the surface complete the changing while electronic device 100 completes the mode switching.

Preferably, the processor 70 is specifically configured to: start to change the surface after the electronic device 100 is switched from the second mode to the first mode.

Although preferred embodiments of the disclosure have been described, further alternations and modifications may be made to these embodiments by those skilled in the art based on the basic creative conception. The appended claims are intended to be interpreted as including the preferred embodiments and all the alternations and modifications falling within the scope of the disclosure.

Apparently, various modifications and variants may be made to the disclosure by those skilled in the art without deviating from the spirit and scope of the disclosure. The disclosure intends to include these modifications and variants which fall within the scope the equivalent of the claims of the disclosure.

The invention claimed is:

1. An electronic device, comprising:
a first body comprising at least a first surface and a second surface opposite to the first surface, wherein an output unit is provided at least on the second surface;
a second body comprising at least a third surface and a fourth surface opposite to the third surface, wherein an input unit is provided at least on the third surface; and
a connector that movably connects the first body to the second body;
wherein upon a relative movement between the first body and the second body by rotation of the connector along an axis of rotation defined by the connector, at least one of the first surface, the second surface, the third surface and the fourth surface is switched between a flat surface and a curved surface, and
wherein two edges of the curved surface, that extend in a direction that is parallel with the axis of rotation defined by the connector are curved edges, and another two edges that are orthogonal to the axis of rotation defined by the connector are straight edges.

2. The electronic device according to claim 1, wherein:
the curved surface is a curved surface of which the shortest connection lines between any two pairs of corresponding points on opposite sides within the curved surface have the same shape and length; or
the curved surface is a curved surface on the same side of any tangent plane of the curved surface; or
the curved surface is a curved surface of which only one set of opposite sides is a curved side.

3. The electronic device according to claim 1, wherein the second surface of the first body is a curved surface, and the output unit comprises a display unit having a curved surface corresponding to the curved second surface.

4. The electronic device according to claim 1, wherein the third surface of the second body is a curved surface, and the input unit comprises a contact input unit having a curved surface corresponding to the curved third surface.

5. The electronic device according to claim 1, wherein the second body further comprises a heat dissipating device for dissipating heat, and the fourth surface of the second body is a curved surface and comprises an outlet to dissipate heat from the electronic device.

6. The electronic device according to claim 1, wherein the connector comprises a first state and a second state,
the connector being in the first state if a distance between a first reference point on the second surface of the first body and a second reference point on the third surface of the second body is greater than a threshold; and
the connector being in the second state if a distance between the first reference point on the second surface of the first body and the second reference point on the third surface of the second body is equal to or less than the threshold.

7. The electronic device according to claim 6, wherein the at least one curved surface becomes a flat surface upon the connector switching from the first state to the second state.

8. The electronic device according to claim 7, wherein the at least one curved surface switches to a flat surface upon the connector switching from the first state to the second state.

9. The electronic device according to claim 7, wherein the electronic device is operable to switch from a first mode to a second mode upon the connector switching from the first state to the second state.

10. The electronic device according to claim 1, wherein at least two of the first surface, the second surface, the third surface and the fourth surface are curved surfaces.

11. The electronic device according to claim 10, wherein the second surface and the third surface are curved surfaces.

12. The electronic device according to claim 1, wherein the first surface, the second surface, the third surface and the fourth surface are curved surfaces.

13. The electronic device according to claim 1, further comprising a link mechanism connected to the first body or the second body, in order to flatten the at least one curved surface.

14. The electronic device according to claim 6, further comprising:
a parameter adjuster that adjusts a control parameter of a surface to switch the surface between a curved surface and a flat surface;
a detection unit that detects a detection parameter for indicating a current distance between the first reference point and the second reference point; and
a processor that receives the detection parameter, and judge whether the current distance indicated by the detection parameter is less than the threshold, so as to determine whether to control the parameter adjuster to adjust the control parameter.

15. The electronic device according to claim 1, wherein the connector is a rotary connecting mechanism.

16. The electronic device according to claim 9, wherein the connector comprises a rotation shaft, and a shape of an end of the first body where the first body is connected to the rotation shaft is different from a shape of an end of the second body where the second body is connected to the rotation shaft, to avoid interference between the first body and the second body upon the electronic device switching between the first mode and the second mode.

17. The electronic device according to claim 9, wherein the connector comprises a rotation shaft having at least a first position state, and upon the rotation shaft being in the first position state, a space is provided between the rotation shaft and at least the first body or the second body, so that the first body rotates relative to the second body thus the electronic device is switched between the first mode and the second mode.

18. The electronic device according to claim 17, wherein a first space is provided between the rotation shaft and the first body and a second space is provided between the rotation shaft and the second body, the first space being different from the second space.

19. The electronic device according to claim 17, wherein the rotation shaft further comprises a second position state different from the first position state, and the rotation shaft is switchable from the second position state to the first position state, to provide a space between the rotation shaft and at least the first body or the second body.

20. The electronic device according to claim 1, wherein the connector is a slidable connection mechanism.

21. A switching method for switching an electronic device, comprising:

switching the electronic device between a first mode and a second mode upon a first body of the electronic device moving relative to a second body of the electronic device, wherein a connector movably connects the first body to the second body, the first body comprises at least a first surface and a second surface opposite to the first surface, the second body comprises at least a third surface and a fourth surface opposite to the third surface;

changing at least one of the first, second, third and fourth surfaces upon switching the electronic device between the first and the second modes, wherein the changing comprises: upon a relative movement between the first body and the second body by rotation of the connector along an axis of rotation defined by the connector, switching at least one of the first, second, third and fourth surfaces between a flat surface and a curved surface or switching at least one of the first, second, third and fourth surfaces between two different curved surfaces, and wherein two edges of the curved surface that extend in a direction that is parallel with the axis of rotation defined by the connector are curved edges, and another two edges that are orthogonal to the axis of rotation defined by the connector are straight edges.

* * * * *